(12) United States Patent
Hamel et al.

(10) Patent No.: US 10,488,492 B2
(45) Date of Patent: Nov. 26, 2019

(54) DISCRETIZATION OF DETECTION ZONE

(71) Applicant: LEDDARTECH INC., Québec (CA)

(72) Inventors: Pier-Olivier Hamel, Québec (CA); Vincent Simard-Bilodeau, Québec (CA); Michael Poulin, L'Ancienne-Lorette (CA); Pierre Olivier, Lévis (CA)

(73) Assignee: Leddarttech Inc., Quebec (CA)

( * ) Notice: Subject to any disclaimer, the term of this patent is extended or adjusted under 35 U.S.C. 154(b) by 395 days.

(21) Appl. No.: 15/509,319

(22) PCT Filed: Sep. 8, 2015

(86) PCT No.: PCT/IB2015/056868
§ 371 (c)(1),
(2) Date: Mar. 7, 2017

(87) PCT Pub. No.: WO2016/038536
PCT Pub. Date: Mar. 17, 2016

(65) Prior Publication Data
US 2017/0254883 A1    Sep. 7, 2017

Related U.S. Application Data

(60) Provisional application No. 62/047,989, filed on Sep. 9, 2014.

(51) Int. Cl.
*G01C 3/02* (2006.01)
*G01S 7/48* (2006.01)
(Continued)

(52) U.S. Cl.
CPC ............ *G01S 7/4808* (2013.01); *G01S 7/484* (2013.01); *G01S 7/486* (2013.01); *G01S 7/487* (2013.01);
(Continued)

(58) Field of Classification Search
CPC ........ G01S 7/4808; G01S 7/487; G01S 7/486; G01S 7/484; G01S 7/4816; G01S 17/89;
(Continued)

(56) References Cited

U.S. PATENT DOCUMENTS 3,680,085 A    7/1972  Del Signore
3,967,111 A    6/1976  Brown
(Continued)

FOREIGN PATENT DOCUMENTS

CA    2633377    6/2007
CA    2710212    7/2009
(Continued)

OTHER PUBLICATIONS

Akindinov et al., 'Detection of Light Pulses Using an Avalanche-Photodiode Array with a Metal-Resistor-Structure', Instruments and Experimental Techniques, Nov. 2004, vol. 48, No. 3 205, pp. 355-363, Russia.
(Continued)

*Primary Examiner* — Samantha K Abraham
(74) *Attorney, Agent, or Firm* — Blueshift IP, LLC; Robert Plotkin

(57) ABSTRACT

A method and system for the detection of an object in a detection zone for a scannerless optical rangefinder operating in pulsed Time-of-Flight operation are described. The method comprises pulsating a light source to illuminate the detection zone using an emission beam; receiving a reflection from the detection zone, collecting the reflection using an optical detector and generating a reflection signal; discretizing the detection zone to create a predetermined detection pattern in the detection zone, the predetermined detection pattern being one of regular, uniform and random, the predetermined detection pattern including passive areas and discrete active detection areas within the detection zone;
(Continued)

detecting an object in one of the discrete active detection areas by comparing a change in the reflection signal with a background signal.

19 Claims, 37 Drawing Sheets

(51) Int. Cl.
    *G01S 17/10*     (2006.01)
    *G01S 17/02*     (2006.01)
    *G01S 7/481*     (2006.01)
    *G01S 7/484*     (2006.01)
    *G01S 7/486*     (2006.01)
    *G01S 17/42*     (2006.01)
    *G01S 17/89*     (2006.01)
    *G01S 7/487*     (2006.01)

(52) U.S. Cl.
    CPC .......... *G01S 7/4815* (2013.01); *G01S 7/4816* (2013.01); *G01S 17/026* (2013.01); *G01S 17/10* (2013.01); *G01S 17/42* (2013.01); *G01S 17/89* (2013.01)

(58) Field of Classification Search
    CPC ...... G01S 17/42; G01S 17/026; G01S 7/4815; G01S 17/10
    See application file for complete search history.

(56) References Cited

U.S. PATENT DOCUMENTS

| | | | |
|---|---|---|---|
| 4,533,242 A | 8/1985 | McLauchlan |
| 4,634,272 A | 1/1987 | Endo |
| 4,717,862 A | 1/1988 | Anderson |
| 4,733,961 A | 3/1988 | Mooney |
| 4,808,997 A | 2/1989 | Barkley |
| 4,891,624 A | 1/1990 | Ishikawa |
| 4,928,232 A | 5/1990 | Gentile |
| 5,102,218 A | 4/1992 | Min |
| 5,134,393 A | 7/1992 | Henson |
| 5,179,286 A | 1/1993 | Akasu |
| 5,270,780 A | 12/1993 | Moran |
| 5,317,311 A | 5/1994 | Martell |
| 5,357,331 A | 10/1994 | Flockencier |
| 5,381,155 A | 1/1995 | Gerber |
| 5,389,921 A | 2/1995 | Whitton |
| 5,546,188 A | 8/1996 | Wangler |
| 5,621,518 A | 4/1997 | Beller |
| 5,627,511 A | 5/1997 | Takagi |
| 5,629,704 A | 5/1997 | Throngnumchai |
| 5,633,629 A | 5/1997 | Hochstein |
| 5,633,801 A | 5/1997 | Bottman |
| 5,663,720 A | 9/1997 | Weissman |
| 5,714,754 A | 2/1998 | Nicholas |
| 5,760,686 A | 6/1998 | Toman |
| 5,760,887 A | 6/1998 | Fink |
| 5,764,163 A | 6/1998 | Waldman |
| 5,777,564 A | 7/1998 | Jones |
| 5,793,491 A | 8/1998 | Wangler |
| 5,805,468 A | 9/1998 | Blohbaum |
| 5,812,249 A | 9/1998 | Johnson |
| 5,828,320 A | 10/1998 | Buck |
| 5,836,583 A | 11/1998 | Towers |
| 5,838,116 A | 11/1998 | Katyl |
| 5,889,477 A | 3/1999 | Fastenrath |
| 5,896,190 A | 4/1999 | Wangler |
| 5,942,753 A | 8/1999 | Dell |
| 5,953,110 A | 9/1999 | Burns |
| 5,963,127 A | 10/1999 | Lang |
| 5,995,900 A | 11/1999 | Hsiao |
| 6,044,336 A | 3/2000 | Marmarelis |
| 6,094,159 A | 7/2000 | Osterfeld |
| 6,100,539 A | 8/2000 | Blumcke |
| 6,104,314 A | 8/2000 | Jiang |
| 6,107,942 A | 8/2000 | Yoo |
| 6,115,113 A | 9/2000 | Flockencier |
| 6,142,702 A | 11/2000 | Simmons |
| 6,147,624 A | 11/2000 | Clapper |
| 6,166,645 A | 12/2000 | Blaney |
| 6,259,515 B1 | 7/2001 | Benz |
| 6,259,862 B1 | 7/2001 | Marino |
| 6,266,609 B1 | 7/2001 | Fastenrath |
| 6,281,632 B1 | 8/2001 | Stam |
| 6,285,297 B1 | 9/2001 | Ball |
| 6,301,003 B1 | 10/2001 | Shirai |
| 6,304,321 B1 | 10/2001 | Wangler |
| 6,340,935 B1 | 1/2002 | Hall |
| 6,363,326 B1 | 3/2002 | Scully |
| 6,377,167 B1 | 4/2002 | Juds |
| 6,388,565 B1 | 5/2002 | Bernhard |
| 6,404,506 B1 | 6/2002 | Cheng |
| 6,411,221 B2 | 6/2002 | Horber |
| 6,417,783 B1 | 7/2002 | Gabler |
| 6,426,708 B1 | 7/2002 | Trajkovic |
| 6,429,941 B1 | 8/2002 | Kamon |
| 6,502,011 B2 | 12/2002 | Haag |
| 6,502,053 B1 | 12/2002 | Hardin |
| 6,516,286 B1 | 2/2003 | Aebischer |
| 6,548,967 B1 | 4/2003 | Dowling |
| 6,556,916 B2 | 4/2003 | Waite |
| 6,559,776 B2 | 5/2003 | Katz |
| 6,580,385 B1 | 6/2003 | Winner |
| 6,642,854 B2 | 11/2003 | McMaster |
| 6,650,250 B2 | 11/2003 | Muraki |
| 6,665,621 B2 | 12/2003 | Drinkard |
| 6,674,394 B1 | 1/2004 | Zoratti |
| 6,753,766 B2 | 6/2004 | Patchell |
| 6,753,950 B2 | 6/2004 | Morcom |
| 6,765,495 B1 | 7/2004 | Dunning |
| 6,771,185 B1 | 8/2004 | Yoo |
| 6,794,831 B2 | 9/2004 | Leeb |
| 6,821,003 B2 | 11/2004 | Baker |
| 6,825,778 B2 | 11/2004 | Bergan |
| 6,831,576 B2 | 12/2004 | Geiger |
| 6,836,317 B1 | 12/2004 | Perger |
| 6,842,231 B2 | 1/2005 | Nourrcier |
| 6,850,156 B2 | 2/2005 | Bloomfield |
| 6,885,311 B2 | 4/2005 | Howard |
| 6,885,312 B1 | 4/2005 | Kirkpatrick |
| 6,917,307 B2 | 7/2005 | Li |
| 6,927,700 B1 | 8/2005 | Quinn |
| 6,946,974 B1 | 9/2005 | Racunas |
| 7,026,954 B2 | 4/2006 | Stemmer |
| 7,049,945 B2 | 5/2006 | Breed |
| 7,081,832 B2 | 7/2006 | Nelson |
| 7,106,214 B2 | 9/2006 | Jesadanont |
| 7,116,246 B2 | 10/2006 | Winter |
| 7,119,674 B2 | 10/2006 | Sefton |
| 7,119,715 B2 | 10/2006 | Orita |
| 7,123,166 B1 | 10/2006 | Haynes |
| 7,135,991 B2 | 11/2006 | Slemmer |
| 7,148,813 B2 | 12/2006 | Bauer |
| 7,209,221 B2 | 4/2007 | Breed |
| 7,221,271 B2 | 5/2007 | Reime |
| 7,221,288 B2 | 5/2007 | Fitzgibbon |
| 7,236,102 B2 | 6/2007 | Shimotani |
| 7,250,605 B2 | 7/2007 | Zhevelev |
| 7,253,747 B2 | 8/2007 | Noguchi |
| 7,317,384 B2 | 1/2008 | Lefranc |
| 7,319,777 B2 | 1/2008 | Morcom |
| 7,321,317 B2 | 1/2008 | Nath |
| 7,350,945 B2 | 4/2008 | Albou |
| 7,352,972 B2 | 4/2008 | Franklin |
| 7,359,782 B2 | 4/2008 | Breed |
| 7,378,947 B2 | 5/2008 | DauraLuna |
| 7,405,676 B2 | 7/2008 | Janssen |
| 7,417,718 B2 | 8/2008 | Wada |
| 7,426,450 B2 | 9/2008 | Arnold |
| 7,486,204 B2 | 2/2009 | Quintos |
| 7,492,281 B2 | 2/2009 | Lynam |
| 7,504,932 B2 | 3/2009 | Bartels |
| 7,573,400 B2 | 8/2009 | Arnold |

(56) References Cited

U.S. PATENT DOCUMENTS

| | | | |
|---|---|---|---|
| 7,616,293 | B2 | 11/2009 | Sirota |
| 7,554,652 | B1 | 12/2009 | Babin |
| 7,633,433 | B2 | 12/2009 | Behrens |
| 7,635,854 | B1 | 12/2009 | Babin |
| 7,640,122 | B2 | 12/2009 | Levesque |
| 7,652,245 | B2 | 1/2010 | Crickmore |
| 7,688,222 | B2 | 3/2010 | Peddle |
| 7,725,348 | B1 | 5/2010 | Allen |
| 7,734,500 | B1 | 6/2010 | Allen |
| 7,760,111 | B2 | 7/2010 | Lynam |
| 7,764,193 | B2 | 7/2010 | Chen |
| 7,796,081 | B2 | 9/2010 | Breed |
| 7,808,401 | B1 | 10/2010 | Schwartz |
| 7,852,462 | B2 | 12/2010 | Breed |
| 7,855,376 | B2 | 12/2010 | Cantin |
| 7,859,432 | B2 | 12/2010 | Kim |
| 7,872,572 | B2 | 1/2011 | Harrington |
| 7,884,740 | B2 | 2/2011 | Tzuang |
| 7,889,097 | B1 | 2/2011 | Arnold |
| 7,889,098 | B1 | 2/2011 | Arnold |
| 7,895,007 | B2 | 2/2011 | Levesque |
| 7,898,433 | B2 | 3/2011 | Roberts |
| 7,917,320 | B2 | 3/2011 | Levesque |
| 7,933,690 | B2 | 4/2011 | Kushida |
| 7,952,491 | B2 | 5/2011 | Schwartz |
| 7,957,900 | B2 | 6/2011 | Chowdhary |
| 8,242,476 | B2 | 8/2012 | Mimeault |
| 8,331,621 | B1 | 12/2012 | Allen |
| 8,436,748 | B2 | 5/2013 | Mimeault |
| 8,593,519 | B2 | 11/2013 | Tauchi |
| 8,600,656 | B2 | 12/2013 | Mimeault |
| 8,629,977 | B2 | 1/2014 | Phillips |
| 8,761,447 | B2 | 6/2014 | Maxik |
| 8,823,951 | B2 | 9/2014 | Mimeault |
| 8,924,140 | B2 | 12/2014 | Sakamoto |
| 9,235,988 | B2 | 1/2016 | Mimeault |
| 9,378,640 | B2 | 6/2016 | Mimeault |
| 9,684,076 | B1* | 6/2017 | Feldkhun ............... G01S 17/89 |
| 2002/0005778 | A1 | 1/2002 | Breed |
| 2002/0033884 | A1 | 3/2002 | Schurr |
| 2002/0117340 | A1 | 9/2002 | Stettner |
| 2003/0154017 | A1 | 8/2003 | Ellis |
| 2003/0189500 | A1 | 10/2003 | Lim |
| 2003/0191568 | A1* | 10/2003 | Breed .................. B60W 40/06 |
| | | | 701/36 |
| 2004/0035620 | A1 | 2/2004 | McKeeferey |
| 2004/0051859 | A1 | 3/2004 | Flockencier |
| 2004/0083035 | A1 | 4/2004 | Ellis |
| 2004/0118624 | A1 | 6/2004 | Beuhler |
| 2004/0130702 | A1 | 7/2004 | Jupp |
| 2004/0135992 | A1 | 7/2004 | Munro |
| 2004/0254728 | A1 | 12/2004 | Poropat |
| 2005/0036130 | A1 | 2/2005 | Arita |
| 2005/0046597 | A1 | 3/2005 | Hutchison |
| 2005/0060069 | A1* | 3/2005 | Breed .................. B60N 2/2863 |
| | | | 701/408 |
| 2005/0078297 | A1 | 4/2005 | Doemens |
| 2005/0117364 | A1 | 6/2005 | Rennick |
| 2005/0137786 | A1* | 6/2005 | Breed .................. B60N 2/2863 |
| | | | 701/482 |
| 2005/0187701 | A1 | 8/2005 | Baney |
| 2005/0231384 | A1 | 10/2005 | Shimotani |
| 2005/0232469 | A1 | 10/2005 | Schofield |
| 2005/0269481 | A1 | 12/2005 | David |
| 2005/0270175 | A1 | 12/2005 | Peddie |
| 2005/0285738 | A1 | 12/2005 | Seas |
| 2006/0033641 | A1 | 2/2006 | Jaupitre |
| 2006/0066472 | A1 | 3/2006 | Janssen |
| 2006/0145824 | A1 | 7/2006 | Frenzel |
| 2006/0147089 | A1 | 7/2006 | Han |
| 2006/0149472 | A1 | 7/2006 | Han |
| 2006/0180670 | A1 | 8/2006 | Acosta |
| 2006/0203505 | A1 | 9/2006 | Griesinger |
| 2006/0221228 | A1 | 10/2006 | Kikuchi |
| 2007/0018106 | A1 | 1/2007 | Zhevelev |
| 2007/0061192 | A1 | 3/2007 | Chew |
| 2007/0091294 | A1 | 4/2007 | Hipp |
| 2007/0096943 | A1 | 5/2007 | Arnold |
| 2007/0181786 | A1 | 8/2007 | Doemens |
| 2007/0205918 | A1 | 9/2007 | RiescoPrieto |
| 2007/0222639 | A1 | 9/2007 | Giles |
| 2007/0228262 | A1 | 10/2007 | Cantin |
| 2007/0255525 | A1 | 11/2007 | Lee |
| 2008/0006762 | A1 | 1/2008 | Fadell |
| 2008/0166023 | A1 | 7/2008 | Wang |
| 2008/0172171 | A1 | 7/2008 | Kowalski |
| 2008/0186470 | A1 | 8/2008 | Hipp |
| 2008/0245952 | A1 | 10/2008 | Troxell |
| 2008/0278366 | A1 | 11/2008 | Behrens |
| 2008/0309914 | A1 | 12/2008 | Cantin |
| 2009/0027185 | A1 | 1/2009 | DauraLuna |
| 2009/0102699 | A1 | 4/2009 | Behrens |
| 2009/0243822 | A1 | 10/2009 | Hinninger |
| 2009/0251680 | A1 | 10/2009 | Farsaie |
| 2009/0267784 | A1 | 10/2009 | Braghiroli |
| 2009/0299631 | A1 | 12/2009 | Hawes |
| 2009/0323741 | A1 | 12/2009 | Deladurantaye |
| 2010/0066527 | A1 | 3/2010 | Liou |
| 2010/0117812 | A1 | 5/2010 | Laubinger |
| 2010/0141765 | A1 | 6/2010 | Capello |
| 2010/0191418 | A1 | 7/2010 | Mimeault |
| 2010/0194595 | A1 | 8/2010 | Mimeault |
| 2010/0214554 | A1 | 8/2010 | Audier |
| 2010/0277713 | A1 | 11/2010 | Mimeault |
| 2010/0309024 | A1 | 12/2010 | Mimeault |
| 2011/0006188 | A1 | 1/2011 | Lin |
| 2011/0025843 | A1 | 2/2011 | Oggier |
| 2011/0026007 | A1 | 2/2011 | Gammenthaler |
| 2011/0115409 | A1 | 5/2011 | Schwartz |
| 2011/0115645 | A1 | 5/2011 | Hall |
| 2011/0134249 | A1 | 6/2011 | Wood |
| 2011/0205521 | A1 | 8/2011 | Mimeault |
| 2011/0235028 | A1 | 9/2011 | Rohrseitz |
| 2012/0268602 | A1 | 10/2012 | Hirai |
| 2012/0287417 | A1 | 11/2012 | Mimeault |
| 2012/0307065 | A1 | 12/2012 | Mimeault |
| 2013/0083316 | A1 | 4/2013 | Mimeault |
| 2013/0100250 | A1* | 4/2013 | Raskar .................. G01S 17/89 |
| | | | 348/46 |
| 2014/0176954 | A1 | 6/2014 | Scott |
| 2014/0232566 | A1 | 8/2014 | Mimeault |
| 2014/0307248 | A1* | 10/2014 | Giger .................... G01S 17/10 |
| | | | 356/5.01 |

FOREIGN PATENT DOCUMENTS

| | | |
|---|---|---|
| CN | 2857132 | 1/2007 |
| DE | 29617413 | 11/1996 |
| DE | 19823135 | 11/1999 |
| DE | 19921449 | 1/2001 |
| DE | 69710579 | 8/2002 |
| DE | 10247290 | 4/2004 |
| DE | 19604338 | 7/2004 |
| DE | 102004035856 | 3/2005 |
| DE | 202005010816 | 11/2005 |
| DE | 102006025020 | 11/2007 |
| DE | 202008007078 | 10/2008 |
| DE | 102007038973 | 2/2009 |
| DE | 102009013841 | 9/2009 |
| DE | 102004016025 | 5/2010 |
| DE | 102008043880 | 5/2010 |
| DE | 102010012811 A1 | 9/2011 |
| EP | 0188393 A1 | 7/1986 |
| EP | 0318260 | 5/1989 |
| EP | 0476562 | 3/1992 |
| EP | 04145390 | 5/1992 |
| EP | 0259445 | 8/1993 |
| EP | 0494815 | 12/1996 |
| EP | 0798684 | 10/1997 |
| EP | 0838695 | 4/1998 |
| EP | 0612049 | 9/1998 |
| EP | 0912970 | 4/2000 |
| EP | 0779990 | 3/2003 |
| EP | 0935764 | 3/2003 |

(56) References Cited

FOREIGN PATENT DOCUMENTS

| | | |
|---|---|---|
| EP | 1296302 | 3/2003 |
| EP | 0789342 | 6/2003 |
| EP | 1334869 A2 | 8/2003 |
| EP | 0784302 | 9/2003 |
| EP | 1034522 | 1/2004 |
| EP | 0866434 | 6/2004 |
| EP | 0988624 | 7/2004 |
| EP | 0834424 | 11/2004 |
| EP | 1220181 | 8/2005 |
| EP | 1521226 | 6/2006 |
| EP | 1049064 | 9/2006 |
| EP | 0904552 | 3/2007 |
| EP | 1052143 | 7/2007 |
| EP | 1542194 | 5/2009 |
| EP | 1048961 | 7/2009 |
| EP | 2106968 | 10/2009 |
| EP | 1224632 | 12/2009 |
| EP | 2136550 | 12/2009 |
| EP | 1435036 | 1/2010 |
| EP | 1611458 | 4/2010 |
| EP | 1997090 | 9/2010 |
| EP | 1859990 | 4/2011 |
| EP | 2306426 A1 | 4/2011 |
| EP | 2393295 A1 | 12/2011 |
| FR | 2690519 | 10/1993 |
| FR | 2743150 | 7/1997 |
| FR | 2743151 | 7/1997 |
| FR | 2749670 | 12/1997 |
| FR | 2910408 | 6/2008 |
| GB | 2264411 | 8/1993 |
| GB | 2311265 | 9/1997 |
| GB | 2354898 | 7/2003 |
| GB | 2369737 | 2/2005 |
| GB | 2399968 | 2/2005 |
| GB | 2431498 | 4/2007 |
| GB | 2445767 | 7/2008 |
| JP | 57206872 | 12/1982 |
| JP | 5824876 | 2/1983 |
| JP | 2059608 | 2/1990 |
| JP | 04145391 | 5/1992 |
| JP | H04172285 A | 6/1992 |
| JP | 5119147 | 5/1993 |
| JP | 6331745 | 12/1994 |
| JP | H07280940 | 10/1995 |
| JP | 09178786 | 7/1997 |
| JP | 2000198385 | 7/2000 |
| JP | 2004102889 | 4/2004 |
| JP | 20051425 A | 1/2005 |
| JP | 2005170184 | 6/2005 |
| JP | 2006021720 | 1/2006 |
| JP | 2006507180 | 3/2006 |
| JP | 2006172210 | 6/2006 |
| JP | 2006258598 | 9/2006 |
| JP | 2006258598 A | 9/2006 |
| JP | 2006521536 | 9/2006 |
| JP | 2007121116 | 5/2007 |
| WO | 8705138 | 8/1987 |
| WO | 1987005138 | 8/1987 |
| WO | 9203808 | 3/1992 |
| WO | 9634252 | 10/1996 |
| WO | 9904378 | 1/1999 |
| WO | 0139153 | 5/2001 |
| WO | 2001085491 | 11/2001 |
| WO | 0215334 | 2/2002 |
| WO | 03000520 | 1/2003 |
| WO | 03007269 | 1/2003 |
| WO | 2004010402 | 1/2004 |
| WO | 2004027451 | 4/2004 |
| WO | 2004036244 | 4/2004 |
| WO | 2004039631 A1 | 5/2004 |
| WO | 2004100103 | 11/2004 |
| WO | 2005008271 | 1/2005 |
| WO | 2005072358 A2 | 8/2005 |
| WO | 2006031220 | 3/2006 |
| WO | 2006044758 | 4/2006 |
| WO | 2006082502 | 8/2006 |
| WO | 2006092659 | 9/2006 |
| WO | 2007005942 | 1/2007 |
| WO | 2007071032 | 6/2007 |
| WO | 2007096814 | 8/2007 |
| WO | 2008037049 | 4/2008 |
| WO | 2008121648 | 10/2008 |
| WO | 2008154736 | 12/2008 |
| WO | 2008154737 | 12/2008 |
| WO | 2009013739 | 1/2009 |
| WO | 2009079789 | 7/2009 |
| WO | 2009087536 | 7/2009 |
| WO | 2009104955 | 8/2009 |
| WO | 2009117197 | 9/2009 |
| WO | 2010033024 | 3/2010 |
| WO | 2010057697 | 5/2010 |
| WO | 2010069002 | 6/2010 |
| WO | 2010122284 | 10/2010 |
| WO | 2010144349 | 12/2010 |
| WO | 2011015817 | 2/2011 |
| WO | 2011025563 | 3/2011 |
| WO | 2011055259 | 5/2011 |
| WO | 2011077400 | 6/2011 |
| WO | 2012011037 A1 | 1/2012 |
| WO | 2012153309 | 11/2012 |
| WO | 2012172526 | 12/2012 |
| WO | 2013128427 | 9/2013 |

OTHER PUBLICATIONS

Braun et al., 'Nanosecond transient electroluminescence from polymer lightemitting diodes', Applied Physics Letters Dec. 1992, vol. 61, No. 26, pp. 3092-3094, California.

Dimitri Loukakos, Active Laser Infrared Detectors, Intelligent Transportation Systems, Traffic Surveillance, California Center for Innovative Transportation at the University of California, Dec. 20, 2001, available at http://www.calccit.org/itsdecision/serv_and_tech/Traffic_Surveillance/road-based/roadside/other_roadside_rep.html on Sep. 16, 2009.

Geneq Inc., Passive Infrared Detector for Traffic Data Acquisition, Model IR 250, Department of Meteorology, available at http://www.geneq.com/catalog/en/ir250.html on Sep. 16, 2009.

Hussain, Tarik Mustafa, City University of New-York, Infrared Vehicle Sensor for Traffic Control, Thesis (PHD) City University of New York, Dissertation Abstracts International, vol. 55-07, Section A, p. 2176, 1994, available at http://adsabs.harvard.edullabs/1994PhDT 85H on Sep. 16, 2009.

Lawrence A. Klein, Vehicle Detector Technologies for Traffic Management Applications, Part 1, Colorado Department of Transportation, Intelligent Transportation Systems (ITS), 1997, available at http://www.cotrip.org/its/ITS%20Guidelines%20Web%20New%20Format%202-05/Web%20Solutions%20Packages/ITS%20Solution%20Packages%20-%20Web%20Copy/Vehicle%20Detectors/Klein%20Part%201%20Vehicle%20Detector%20Technologies.doc on Sep. 16, 2009.

Shimoni, et al., 'Detection of vehicles in shadow areas,' Workshop on Hyperspectral Image and Signal Processing: Evolution in Remote Sensing (WHISPERS), 2011 3rd, Jun. 6-9, 2011, pp. 1-4, IEEE, Lisbon.

Tayfun Kon, Thesis, "Collision Warning and Avoidance System for Crest Vertical Curves", Virginia Tech, May 4, 1998, Appendix 82, pp. 51-92, published on Digital Library and Archives, University Libraries of Virginia Tech, VA.

The Vehicule Detector Clearinghouse, "A Summary of Vehicle Detection and Surveillance Technologies used in Intelligent Transportation Systems", Fall 2000, Southwest Technology Development Institute (SWTDI) at New Mexico State University (NMSU), sponsored in cooperation with the U.S. Department of Transportation FHWA, available at http://www.fhwa.dot.gov/ohim/tvtw/vdstits.

U.S. Department of Transportation Federal Highway Administration, 'Detailed Monitoring Protocol 4.0 Monitoring Methods', Department of Air Quality, Air Toxic MSAT, available at http://www.fhwa.dot.gov/environment/air_quality/air_toxics/research_and_analysis/near_road_study/protocol/protocol04.cfm, Updated on Jul. 6, 2011.

(56) References Cited

OTHER PUBLICATIONS

United States Department of Transportation, Federal Highway Administration, Sensor Technology—Chapter 2, Traffic Detector Handbook : Third Edition—vol. 1, FHWA-HRT-06-108, available at http://www.tfhrc.gov/its/pubs/06108/02a.htm on Sep. 16, 2009.
United States Department of Transportation, Research and Innovative Technology Administration, 5.3. Infrared Detectors, available at http://ntl.bts.gov/DOCS/96100/ch05/body_ch05_03.html on Sep. 16, 2009.
Gutelius, Follow the Leddar—Review of a low-cost detection and ranging device:, LIDAR News Magazine, vol. 4, No. 5, Jul. 5, 2014, pp. 40-46, XP055393754.

* cited by examiner

| Object Height | Covered Area Percentage |
|---|---|
| 0.5 | 27.9 % |
| 1.5 | 68.0 % |
| 2 | 79.8 % |

FIG. 9D

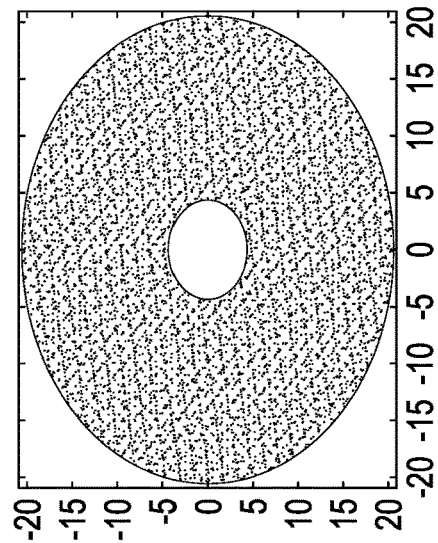
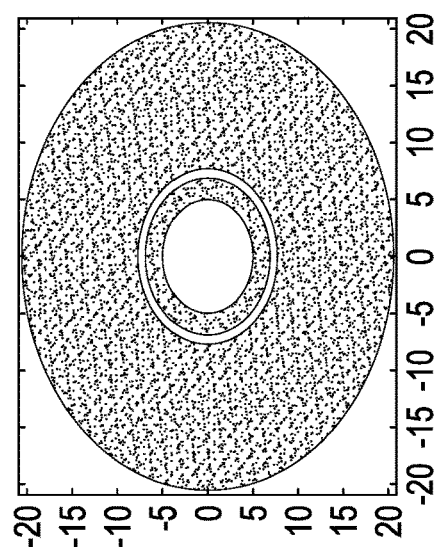
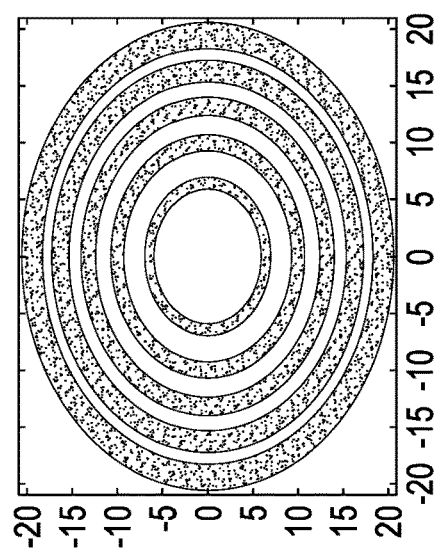
FIG. 10C
FIG. 10B
FIG. 10A

| Object Height | Covered Area Percentage |
|---|---|
| 0.5 | 46.3 % |
| 1.5 | 81.4 % |
| 2 | 85.3 % |

FIG. 10D

| Object Height | Covered Area Percentage | Covered Area Percentage to Number of Beam Ratio |
|---|---|---|
| 0.5 | 18.0 % | 0.0702 %/beam |
| 1.5 | 41.1 % | 0.161 %/beam |
| 2 | 49.7 % | 0.194 %/beam |

FIG. 13D

| Object Height | Covered Area Percentage | Covered Area Percentage to Number of Beam Ratio |
|---|---|---|
| 0.5 | 34.5 % | 0.0673 %/beam |
| 1.5 | 63.8 % | 0.125 %/beam |
| 2 | 70.9 % | 0.138 %/beam |

FIG. 15D

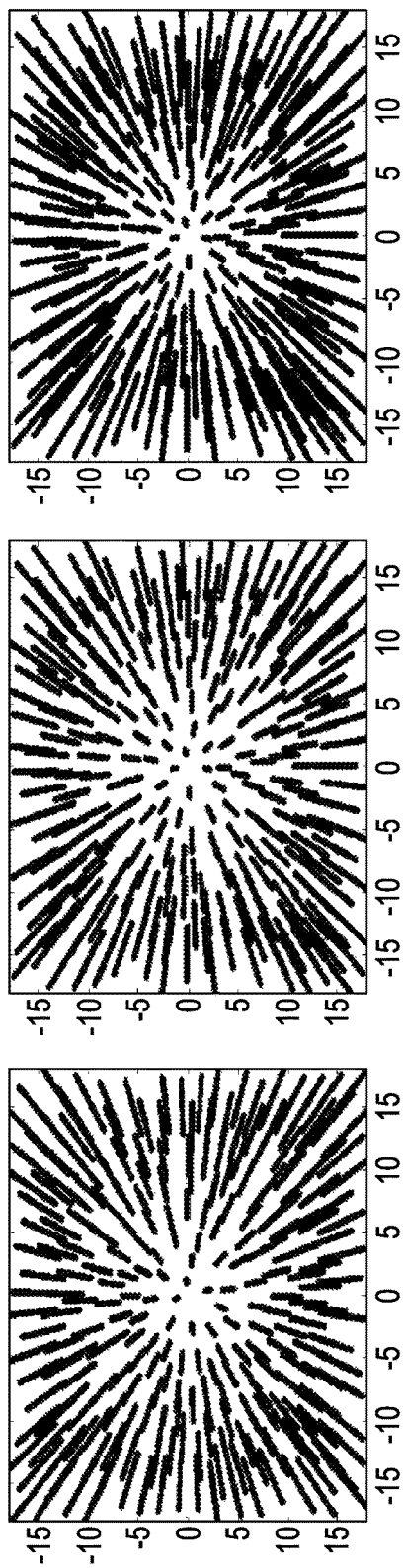

| Object Height | Covered Area Percentage | Covered Area Percentage to Number of Beam Ratio |
|---|---|---|
| 0.5 | 18.6 % | 0.0727 %/beam |
| 1.5 | 40.4 % | 0.158 %/beam |
| 2 | 48.0 % | 0.188%/beam |

FIG. 17D

| Emission Pattern | Covered Area Percentage | Maximum Signal Variation From Background | |
|---|---|---|---|
| | | Beam Length of 12 m | Beam Length of 24 m |
| Non-Merging Signal Concentric Ring | 47.9 % | 0.0239 | 0.000668 |
| 16x16 Dot Array | 41.1 % | 0.0243 | 0.00136 |

FIG. 28

DISCRETIZATION OF DETECTION ZONE

TECHNICAL FIELD

The invention relates to time-of-flight detection systems and methods and more particularly, to the discretization of the detection zone for such systems and methods.

BACKGROUND OF THE ART

Looking directly at a planar surface poses an issue for a time-of-flight detector, such as a wide-angle LEDDAR™, because the same surface is located at many different distances from the detector. For example, for a detector mounted 40 ft high looking straight down at a 140° angle, the ground just below the detector is located 40 ft away, whereas a point on the edge of the detection zone is approximately 120 ft away from the detector. This is illustrated schematically in FIG. 1.

Therefore, an object entering the detection zone can only be discriminated in regards of its reflectance relative to the ground multiplied by the relative surface area it is occupying. In some applications, the surface ratio between the object to be detected and the illuminated zone renders the detection of the presence of the object complex using conventional methods.

There are many applications in which time-of-flight detectors are useful, for example to activate or deactivate systems depending on the presence/absence of an object such as a vehicle, a person, an animal, etc. Such presence-controlled systems include interior and exterior smart lighting; indoor climate control/automation; security and surveillance (presence/movement/location of people, vehicles, etc.); obstacle and collision avoidance systems for cars, trucks, vans and other vehicles including marine vehicles, aircrafts, trains, etc. and for heavy equipment with displaceable arms or sections; navigation systems for terrestrial, marine, aerial, rail vehicles; level and volume sensing for solids and liquids; objects, people and animal profiling; and proximity detection.

In these applications, it would be useful to discriminate objects based on their distance from the detector.

SUMMARY

According to one broad aspect, there is provided a method of detection of an object in a detection zone, for a scannerless optical rangefinder operating in pulsed Time-of-Flight operation. The method comprises illuminating the detection zone using an emission beam; receiving a reflection from the detection zone and generating a reflection signal; discretizing the detection zone in discrete illuminated areas; detecting an object in one of the discrete illuminated areas by comparing a change in the reflection signal with a background signal.

In one embodiment, discretizing the detection zone is carried out by shaping the emission beam into sub-beams to create a predetermined illumination pattern in the detection zone, the pattern being one of a regular, a uniform and a random pattern, the pattern including non-illuminated areas and discrete illuminated areas within the detection zone.

In one embodiment, discretizing the detection zone is carried out by shaping reception optics for the receiving a reflection signal to output a discretized reflection signal following a predetermined pattern, the pattern being one of a regular, a uniform and a random pattern.

In one embodiment, illuminating the detection zone using the emission beam includes pulsating a light source at a constant rate.

According to another broad aspect, there is provided a method of detection of an object in a detection zone, for a scannerless optical rangefinder operating in pulsed Time-of-Flight operation, the method comprising: pulsating a light source to illuminate the detection zone using an emission beam; receiving a reflection from the detection zone, collecting the reflection using an optical detector and generating a reflection signal; discretizing the detection zone to create a predetermined detection pattern in the detection zone, the predetermined detection pattern being one of regular, uniform and random, the predetermined detection pattern including passive areas and discrete active detection areas within the detection zone; detecting an object in one of the discrete active detection areas by comparing a change in the reflection signal with a background signal.

In one embodiment, discretizing the detection zone includes shaping the emission beam into sub-beams using emission optics, the discrete detection areas being discrete illuminated areas and the passive areas being non-illuminated areas.

In one embodiment, discretizing the detection zone includes shaping the reflection signal using reception optics to output a discretized reflection signal following the predetermined pattern.

In one embodiment, the predetermined pattern is one of concentric rings about a predetermined point, an array of regularly-arranged illuminated dots and a randomly generated pattern of illuminated dots.

In one embodiment, illuminating the detection zone using the emission beam includes alternately illuminating the detection zone using at least two light sources, shaping the emission beam including shaping each emission beam generated by the at least two light sources, the predetermined detection pattern being created by a sum of partial detection patterns of the at least two light sources.

In one embodiment, the method further comprises individually controlling power emitted by each of the at least two light sources to generate the partial detection patterns thereby creating controlled detection sensitivity zones, a higher power partial detection pattern corresponding to a higher detection sensitivity zone.

In one embodiment, the method further comprises estimating a distance between the object and the optical rangefinder by the change in the reflection signal with the background signal.

In one embodiment, the light source is one of a Light-Emission-Diode (LED) light source and a laserdiode.

In one embodiment, generating the reflection signal includes collecting the reflection using an optical detector.

In one embodiment, the optical detector is a photodiode.

In one embodiment, the emission beam is one of a visible emission beam and an invisible beam, the visible emission beam being visible to an unaided human eye.

In one embodiment, the object is one of a vehicle, an automobile, a motorcycle, a truck, a bicycle, a cyclist, a pedestrian, an animal, a particle, a gas and a liquid.

According to another broad aspect, there is provided a presence detection system for a detection of an object in a detection zone, for a scannerless optical rangefinder operating in pulsed Time-of-Flight operation. The system comprises at least one light source adapted to be pulsed to illuminate the detection zone using an emission beam; an optical detector for receiving and collecting a reflection from the detection zone and for generating a reflection signal; at least one of emission optics and reception optics for discretizing the detection zone to create a predetermined detection pattern in the detection zone, the predetermined detection pattern being one of regular, uniform and random, the predetermined detection pattern including passive areas and discrete active detection areas within the detection zone; a processor in electronic communication with at least the optical detector, the processor being programmed with computer-readable instructions, for detecting an object in one of the discrete active detection areas by comparing a change in the reflection signal with a background signal and for outputting a signal based on the detecting the object.

In one embodiment, the system further comprises a switch for alternately illuminating the detection zone using at least two light sources, the predetermined detection pattern being created by a sum of partial detection patterns of the at least two light sources.

In one embodiment, the system further comprises at least one power controller for controlling an intensity of the emission beam.

In one embodiment, the processor is further for estimating a distance between the object and the optical rangefinder by the change in the reflection signal with the background signal.

BRIEF DESCRIPTION OF THE DRAWINGS

Having thus generally described the nature of the invention, reference will now be made to the accompanying drawings, showing by way of illustration example embodiments thereof and in which:

FIG. 3 includes FIG. 3A, FIG. 3B, FIG. 3C, FIG. 3D and FIG. 3E in which

FIG. 10 includes FIG. 10A, FIG. 10B and FIG. 10C which show the coverage of the merging concentric ring pattern for an object having a height of 0.5 m, 1.5 m and 2 m respectively and FIG. 10D which is a table listing the covered area percentage for the merging concentric ring pattern (in a radius of 3 time the sensor mounting height);

FIG. 17 includes FIG. 17A, FIG. 17B and FIG. 17C which show the coverage of the random 256 dot pattern coverage for an object having a height of 0.5 m, 1.5 m and 2 m respectively and FIG. 17D which is a table listing the covered area percentage for the random 256 dot pattern;

FIG. 24 includes FIG. 24A and FIG. 24B which are graphs of the signal variations from the background for the 16×16 uniform dot pattern.

FIG. 28 is a table showing a comparison of the non-merging signal concentric ring with the 16×16 dot array pattern with an object radius and height of 0.5 and 1.5 m, including covered area percentage and maximum signal variation from background at 12 m and 24 m;

DETAILED DESCRIPTION

The present system and method allows to discretize a detection zone into distinct areas sufficiently spaced apart to allow detection of objects passing through each zone. A pattern is used to discretize the detection zone. The concept can be used in many applications that require detection of objects (such as a vehicle, an automobile, a motorcycle, a truck, a bicycle, a cyclist, a pedestrian, an animal, a particle, a gas and a liquid) over a large area.

Figure 1:
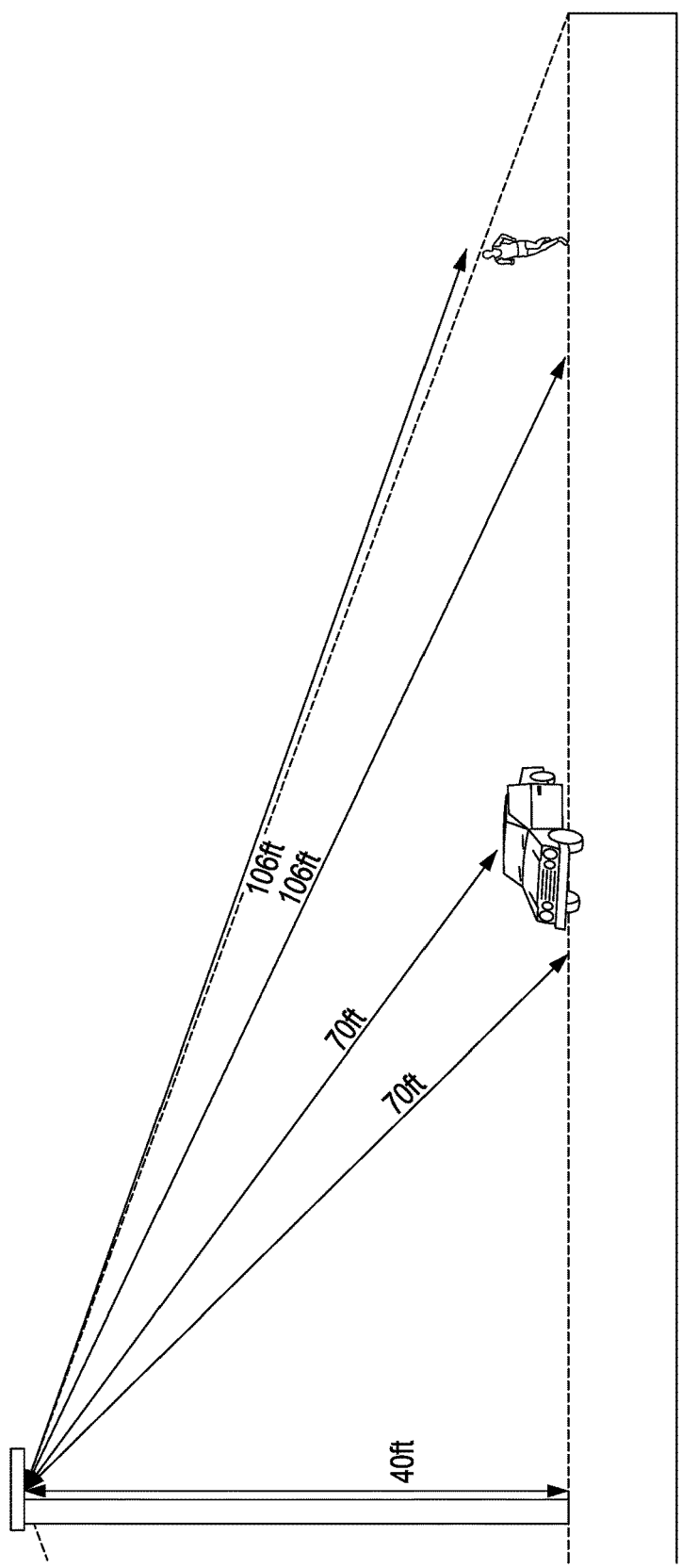
FIG. 1 (prior art) is a schematic representation of a single detection zone in which objects cannot be discriminated in regards to distance.
Figure 2:
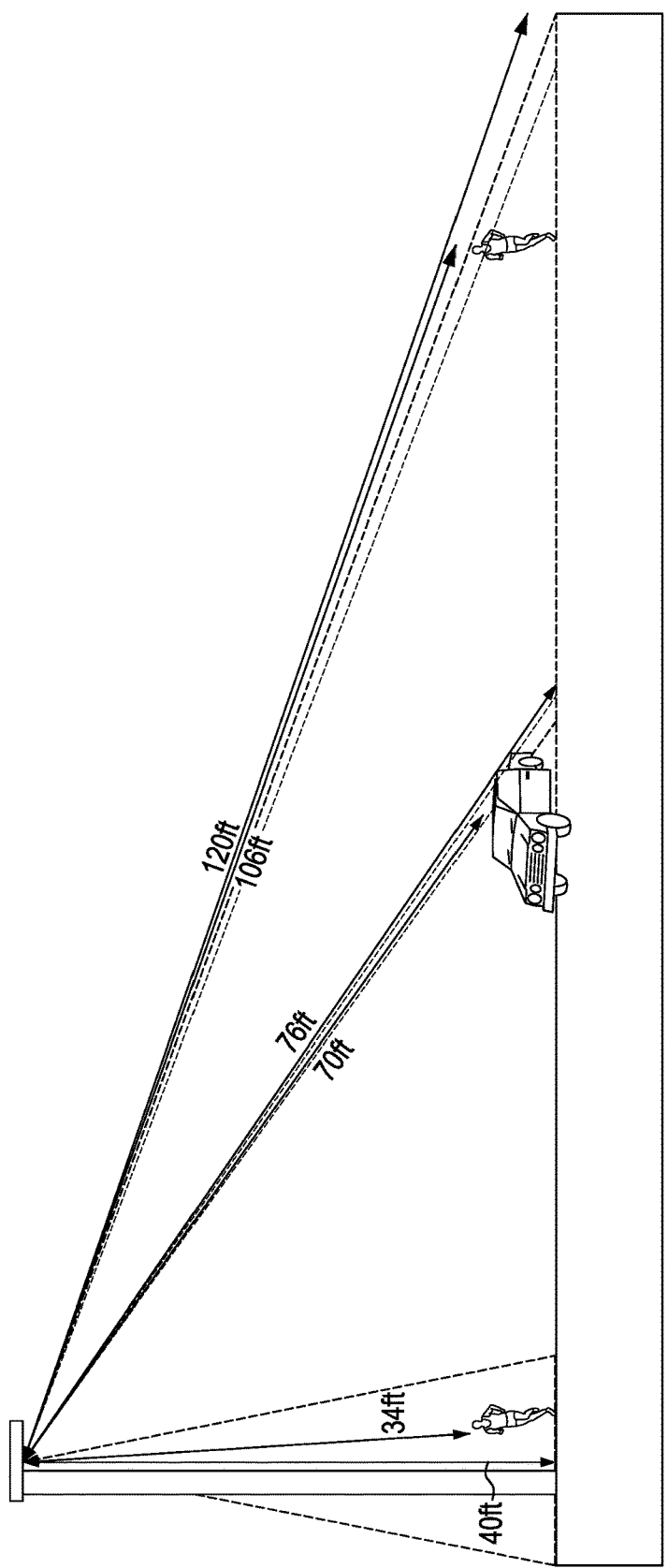
FIG. 2 is a schematic representation of a detection zone with discrete rings of detection in which objects can be discriminated in regards to distance.

One example pattern that can be used to discretize the detection zone is concentric rings. The rings form discrete active detection areas which are separated by passive areas in which detection does not occur. This can be used, for example, in the case of a detector looking straight down at the ground. Using rings allows covering the whole perimeter of the detection zone, ensuring there are no blind spots at the edge of the area. FIG. 2 shows three discrete rings of detection in which objects are located. Other patterns can be used to discretize the detection zones. Some other example patterns are described hereinbelow.

The discretization pattern can be achieved in two possible ways, namely by shaping the emission beam or by shaping the reception optics. The passive area is therefore a non-illuminated area of the detection zone or an area which is filtered out before detection occurs. Shaping the emission beam yields the maximum lighting efficiency but is more complex. Shaping the reception optics is simple but uses only a small percentage of the lighting power for detection. It requires more light to achieve the surface coverage. Shaping the received light presents an equivalent advantage with respect to the amplitude of the variation of the signal received with respect to the background.

As will be readily understood, the light source could emit light visible or invisible to the unaided human eye, depending on the application. In the case where visible light is used to detect presence in an area in which people are expected to circulate, the irregular and unusual pattern of illumination in the area may be visible if the emission beam is shaped to create the discretization pattern. The active detection areas and the passive areas will be apparent to a passerby. One may therefore prefer to shape the reception optics, even if it is less energy efficient, to accommodate user preferences.

The working principle of the presence detector is the following. The sensor pulses a light source to illuminate the monitored zone. The pulsed light is reflected back to the sensor and collected by an optical detector, such as a photodiode. The presence of the moving objects in the monitored zone is detected by looking for changes in the received signal by comparing it to the background signal.

In one embodiment, the light emitted by the sensor is shaped such that only discrete regions, active detection areas, of the monitored zone are illuminated by the sensor. In other words, discretizing the detection zone is carried out by shaping the emission beam into sub-beams to create a predetermined illumination pattern in the detection zone. The discretization of the covered area increases the surface ratio between the moving object and the background. This results in a greater variation of the signal when an object is inside the active detection area. In other words, the discretization of the emission pattern allows to significantly increase the size of the monitored zone and maintain a signal variation which is sufficiently large to be detectable by the sensor. A more advanced analysis to the signal variation allows to get a measurement of the distance between the sensor and the object.

The shape of the pulsed light can take on one of several patterns. The selected pattern is designed to maximize the probability that an object will intercept a light beam while it moves into the monitored zone. The emission pattern can be also be adapted to the shape of the covered area. Various examples of the emission pattern shapes are described herein. Other emission pattern shapes will be apparent to those skilled in the art.

Figure 3A:
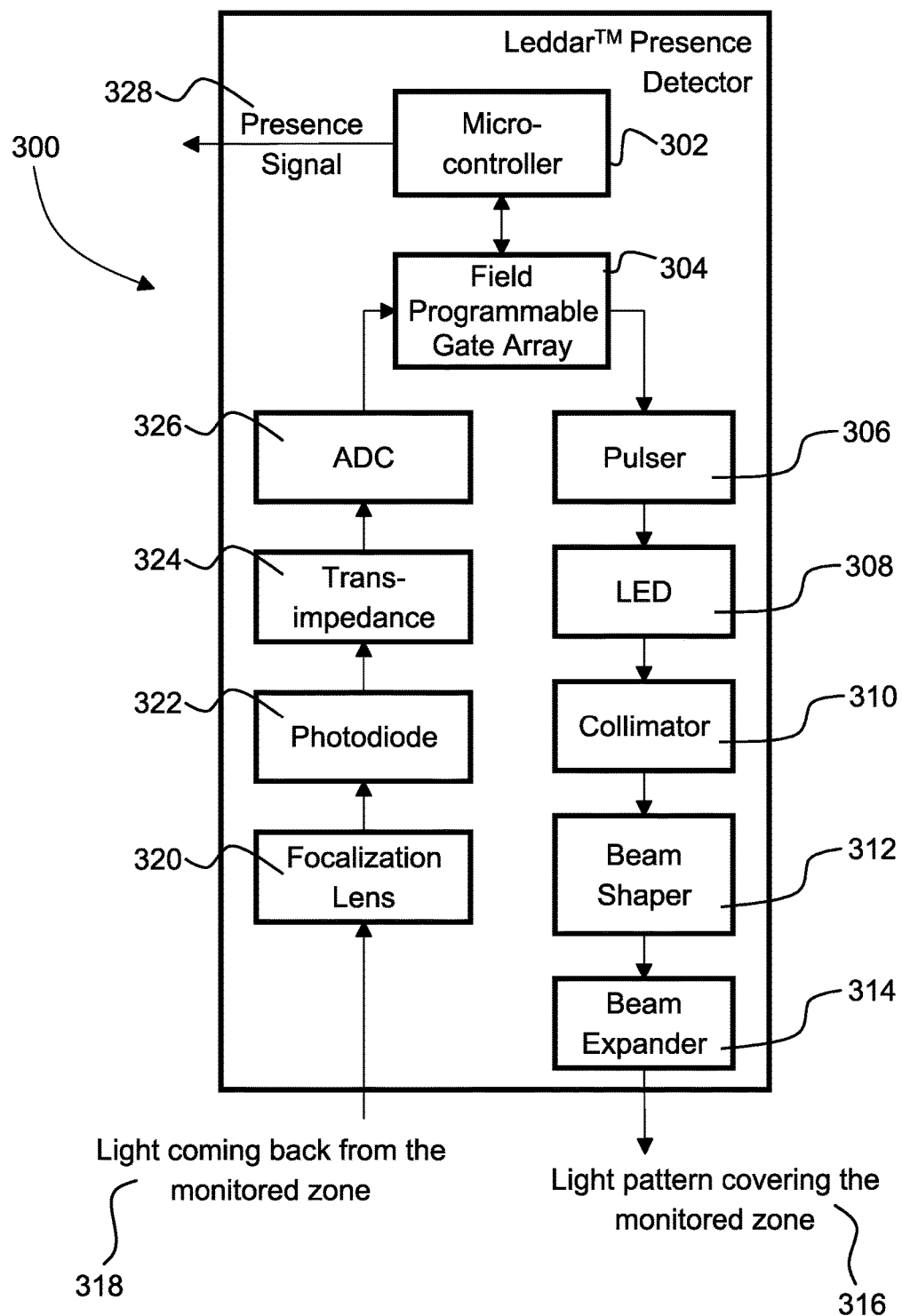
FIG. 3A is a block diagram of example components of the presence detection hardware with beam shaping emission optics.

FIG. 3A shows an example block diagram for the hardware components of an example embodiment of the present system in which the emission beam is shaped according to the required discretization pattern. In this example embodiment, the time-of-flight detection is carried out by a LED-DAR™ presence detection system 300. However, the same concept could be applied to any existing detection systems.

The hardware components work as follows. For the emission of a light pattern covering the monitored zone 316 with discrete active detection areas and passive areas, the following steps occur. The pulser 306 pulses the LED light source 308 at a constant rate. The width of the pulses and the current sent to the LED light source 308 can be adjusted to the needs of the application. The collimator 310 narrows the beam of light emitted by the LED light source 308. A beam shaper 312 shapes the narrow collimated light beam in order to obtain the desired discretized emission pattern. The beam shaping can be achieved using, for example, so-called diffractive optical elements. Diffractive optical elements can be seen as a set of microstructures that operate by means of interference and diffraction to produce specific or arbitrary distributions of light. The microstructures can be etched in fused silica, in other glass types or embossed in various polymer materials. The beam expander 314 increases the diffusion angle of the emitted light beam so it can cover a large area. The beam expander magnification ratio can be adjusted to the needs of the application. The discretized emission pattern creates the discrete active detection areas and the passive areas on the surface of the monitored zone. The discrete active detection areas and passive areas are actually volumes of illuminated and non-illuminated space between the LED light source 308 and the surface of the monitored zone. The shape of the discrete active detection areas and the passive areas varies at different distances from the light source 308.

Some of the light sent into the monitored zone is reflected back towards the Presence Detector 300. The focalization lens 320 focalizes the signal reflected on the monitored area 318 on the photo-sensitive surface of the photodiode 322. The photodiode 322 converts the received photons into a current. The transimpedance 324 converts the variations of the current passing through the photodiode 322 into a voltage. The Analog to Digital Converter (ADC) 326 converts the voltage outputted by the transimpedance 324 into a discrete number.

The Field Programmable Gate Array (FPGA) 304 controls the LED pulser 306 as well as the acquisition of the photodiode signal from the ADC 326. The LED pulses are synchronized to the signal acquisition mechanism. It implements the oversampling and the accumulation principles which maximize the received signal to noise ratio and increase the sampling resolution. Example processing aspects carried out by the signal acquisition mechanism and processor are described in U.S. Pat. No. 7,640,122. The acquired signal is called "trace". A trace is a sequence of ADC samples. The value of each sample corresponds to the amount of LED light, also called count, received by the photodiodes at a given time. The shape of the trace is determined by the shape and the distance of the objects (including the surface of the monitored area) reflecting the light emitted by the LED in the monitored zone. The trace is actually a sum of the object reflections in the monitored zone. The reflections induced by the objects located close to the sensor will appear earlier in the trace while the reflections due to far object will appear later.

The microcontroller 302 synchronizes the operation of the components of the system. It also implements the signal processing algorithm that detects change in the monitored zone by analyzing the traces provided by the FPGA 304. A presence signal 328 is emitted by the microcontroller 302 upon detection of a presence of an object in the monitored zone.

The combination of the collimator 310, the beam shaper 312 and beam expander 314 in this example is therefore used to shape the beam of light emitted by the LED light source 308. Other emission optics could be used to control the LED light source 308 to emit a beam of light with a particular shape to create discrete active detection areas and passive areas.

Figure 3B:
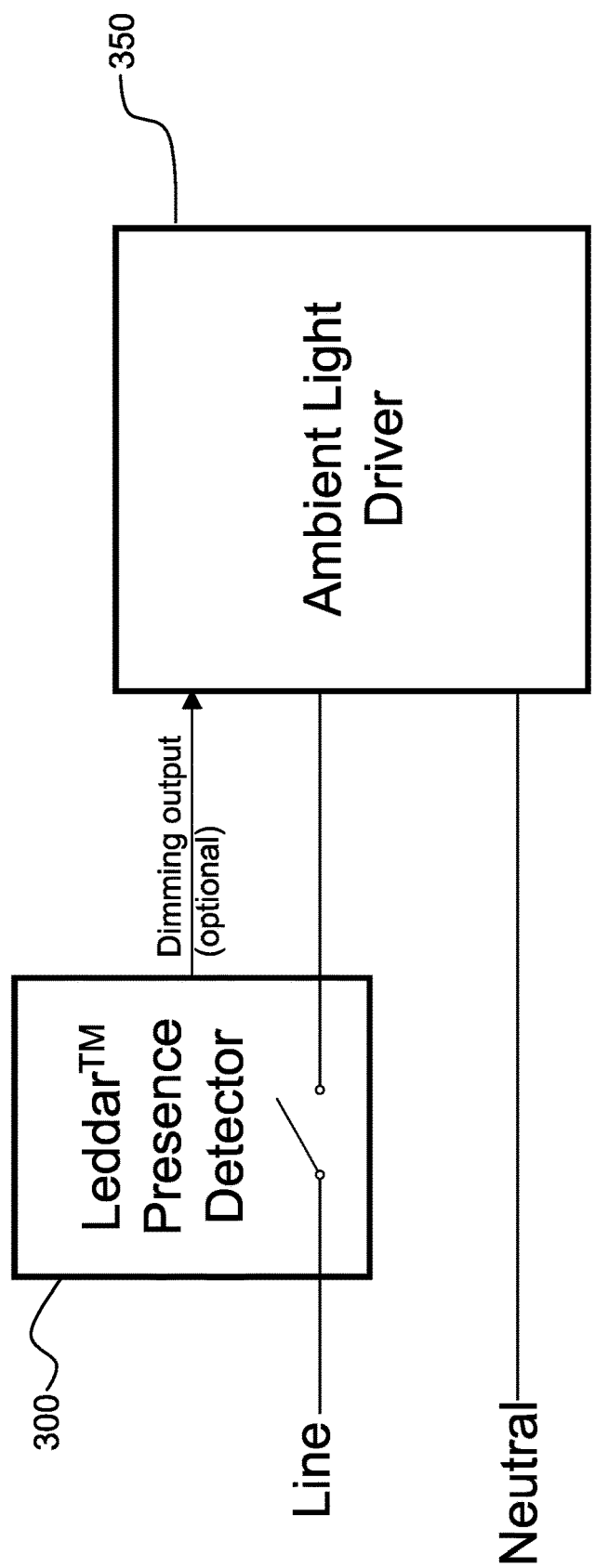
FIG. 3B is a block diagram of an example interaction of the presence detection hardware with the ambient light driver and FIG. 3C is a block diagram of example components of an alternative presence detection hardware with beam shaping reception optics and FIG. 3D is a block diagram of example components of another alternative presence detection hardware with both beam shaping emission optics and reception optics and FIG. 3E is a block diagram of example components of the presence detection hardware with multiple light sources.
Figure 3C:
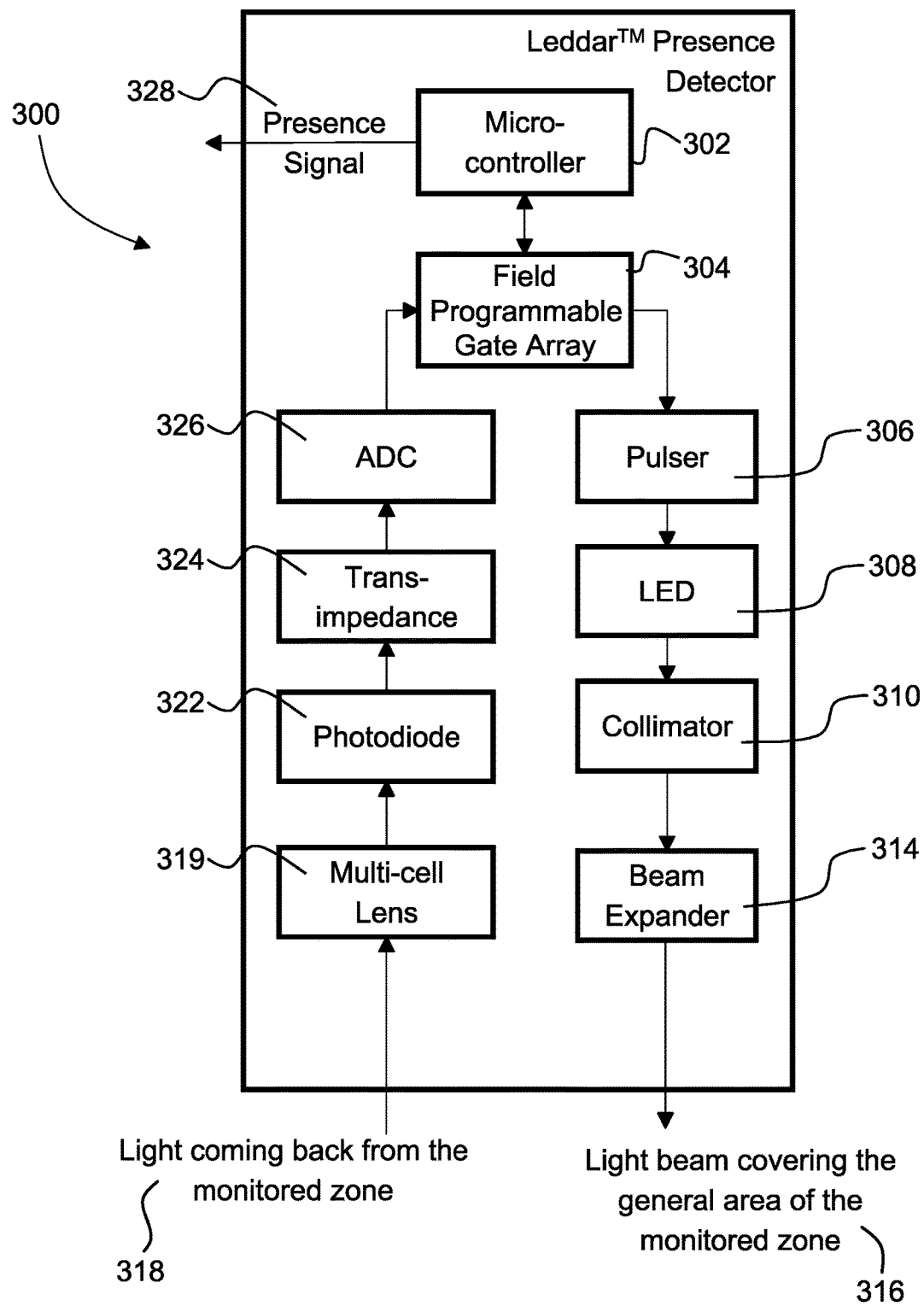
Figure 3D:
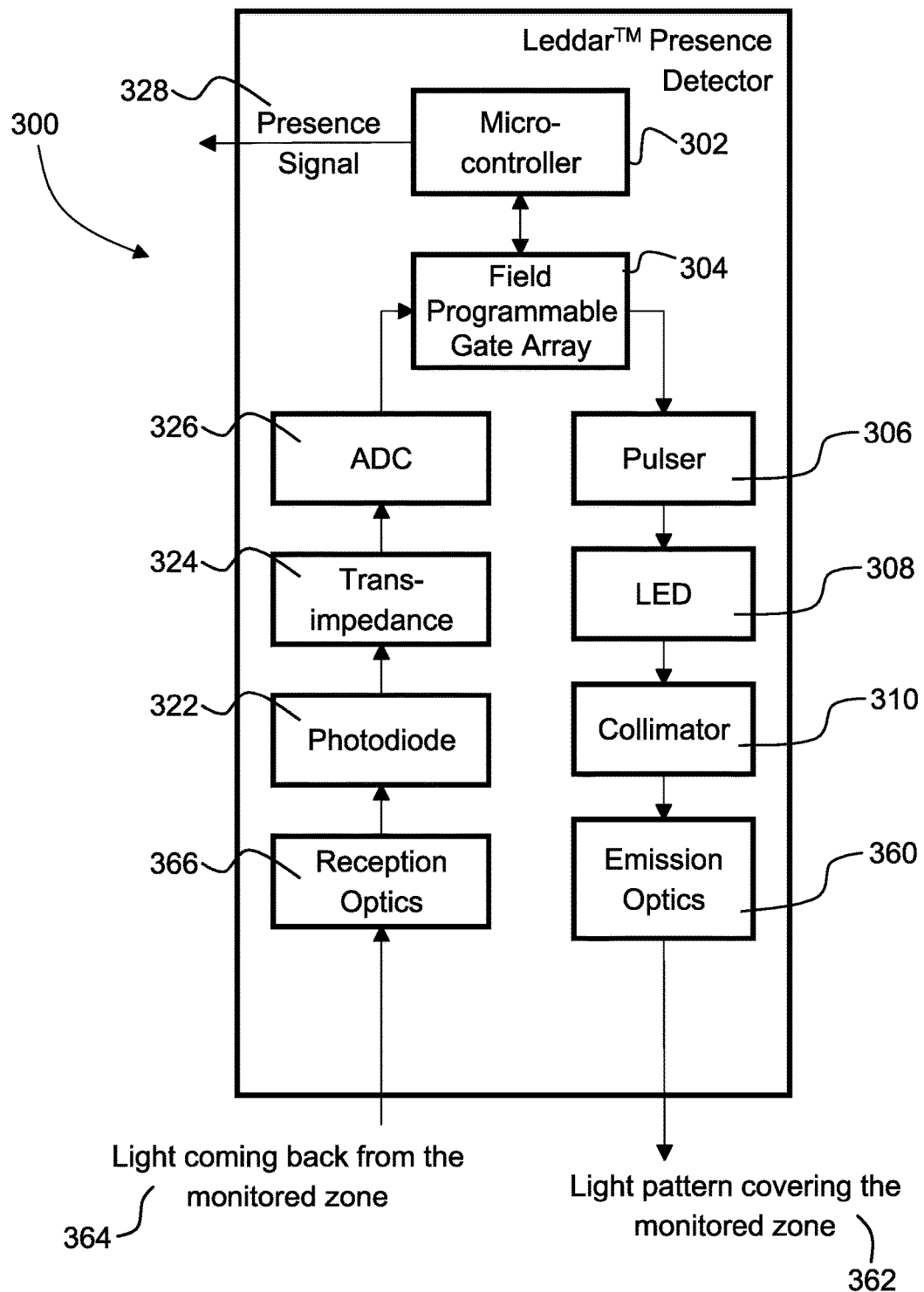
Figure 3E:
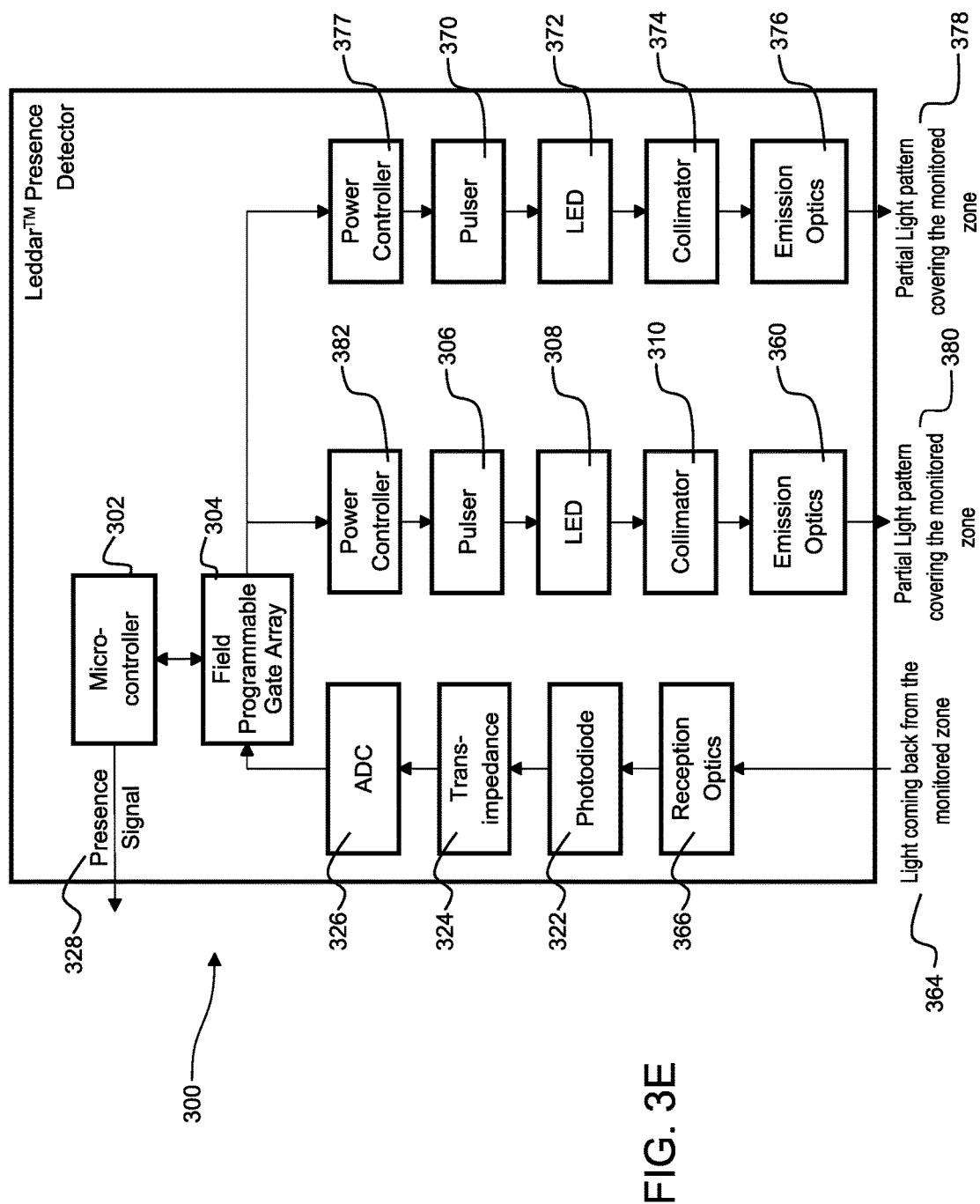

As shown in FIG. 3E, the system 300 can include a plurality of LED light sources 372, 308 each with their emission optics 376, 360 to create partial detection patterns 378, 380. The emission of the beams of each LED light source can be synchronized by the Field Programmable Gate Array 304 to alternately illuminate the detection zone. The predetermined detection pattern is then created by a sum of the partial detection patterns. It is further possible to individually control the power emitted by each of the light sources 372, 308 using power controller 377, 382 to create controlled detection sensitivity zones, a higher power partial detection pattern corresponding to a higher detection sensitivity zone. The power controller 377, 382 can, for example, be an electronic component which limits the current in the LED light source 308, 372. Alternatively, this intensity control could be performed by an optical component.

FIG. 3B presents the interaction of the system shown in FIG. 3A with an ambient light driver 350. The LEDDAR™ presence detection system 300 can provide an optional dimming command to the ambient light driver 350. Otherwise, the ambient light driver 350 is controlled by the detection output of the LEDDAR™ presence detection system 300. In this example, the ambient light driver 350 is the controller for the ambient light in the region to monitor.

FIG. 3C shows a block diagram of main components of an example alternative system in which the received beam is shaped according to the required discretization pattern. The whole monitored area is illuminated. Beam shaper 312 is omitted in the emission path and multi-cell lens 319 is used in the return path to shape the beam according to the required discretization pattern. The multi-cell lens 319 is an assembly of several lenses which focalizes the reflected light of a particular discrete point of the monitored zone. Multi-cell lens 319 could be replaced by other reception optics which can be used to shape the received beam reflected back from the monitored zone according to the discretization pattern.

FIG. 3D shows a block diagram of main components of another example alternative system in which both the emitted beam and the received beam are shaped according to the required discretization pattern. Emission optics 360 shape the emitted light beam to create a light pattern covering the monitored zone 362. For example, emission optics 360 can include beam shaper 312 and/or beam expander 314. The light coming back from the monitored zone 364 is then shaped by reception optics 366. For example, reception optics 366 can include multi-cell lens 319 and/or focalization lens 320. The shaping performed by the emission optics 360 is cumulative with that of the reception optics 366 thereby creating an overall discretization pattern. This combination approach is useful in many applications including, for example, in systems where light visible to the unaided human eye is used for the detection and corridors formed by the passive areas should be made less apparent.

Figure 4:
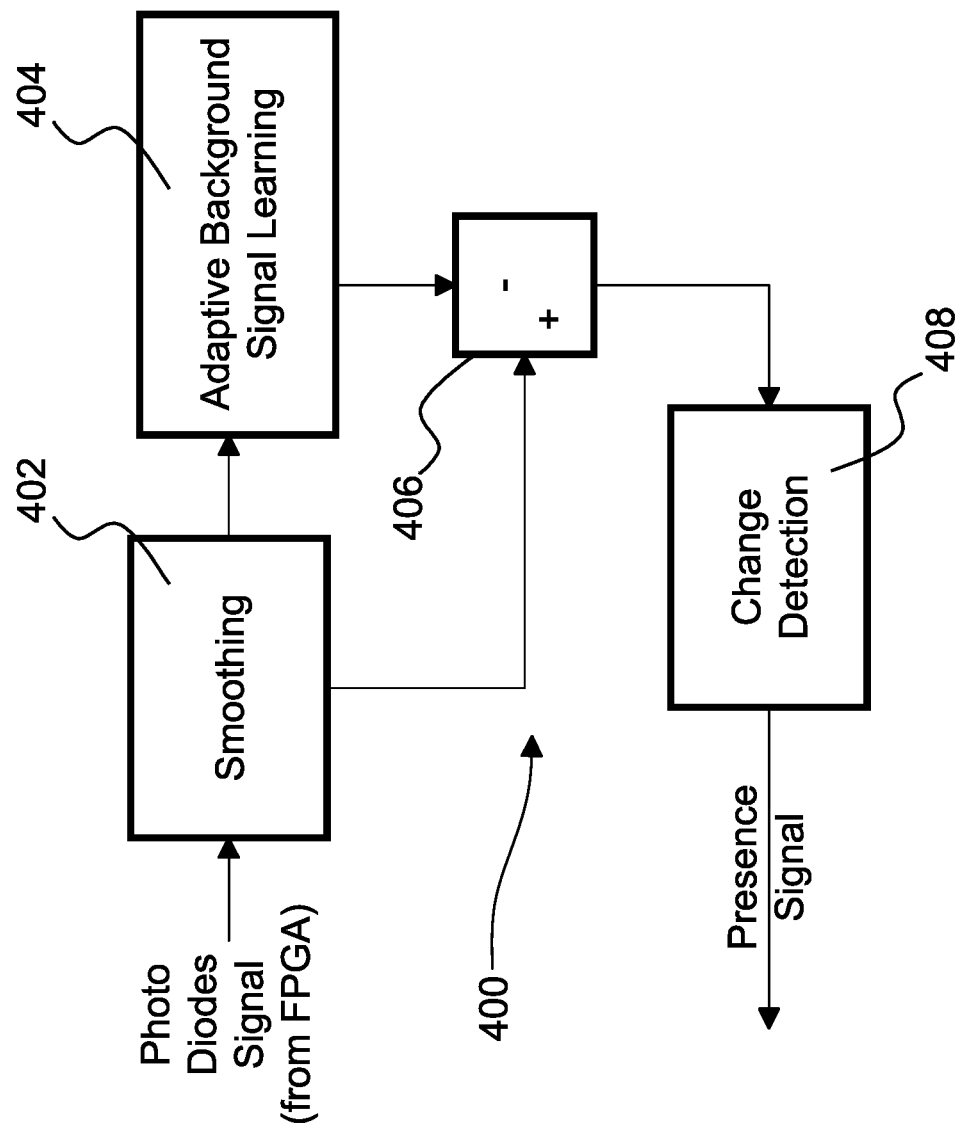
FIG. 4 is a flow chart of example steps for the processing algorithm.

Example steps of the signal processing algorithm 400 which can be programmed into a signal processor are described in FIG. 4. The processor is programmed with computer-readable instructions. The trace signal is smoothed using a low pass filter. This step softens the white noise in the trace. The Adaptive Background Signal Learning step 404 determines the shape of the background trace using a recursive average filter on the magnitude of each sample of the trace. The cut-off frequency of the filter is established so the background signal concentrates on long term changes in the trace. The background signal is subtracted 406 from the smoothed trace. The change detection step 408 detects changes in the trace by analyzing the differences between the background signal and the current trace.

The change detector is not a simple threshold detector; it analyzes the shape of the current signal variation from the background to minimize false detections due, for example, to the motion of the sensor induced by the wind in an exterior installation. In fact, the position of the signal variation in the trace gives insight about the distance between the object and the sensor. In addition, because the area to monitor is discretized in a plurality of zones located at various distances from the sensor, the amplitude of the signal variation when an object enters one of the zones is increased. These aspects contribute to an efficient and precise detection of an object in the area.

Beam Pattern Design

Different discretization patterns with discrete active detection areas and passive areas can be created according to the application needs. Below are example patterns and the calculated coverage area percentage for each example pattern. Generally speaking, the predetermined pattern is one of concentric rings about a predetermined point, an array of regularly-arranged illuminated dots and a randomly generated pattern of illuminated dots.

Example Pattern 1. Non-Merging Signal Concentric Ring Pattern

Figures 5A, 5B:
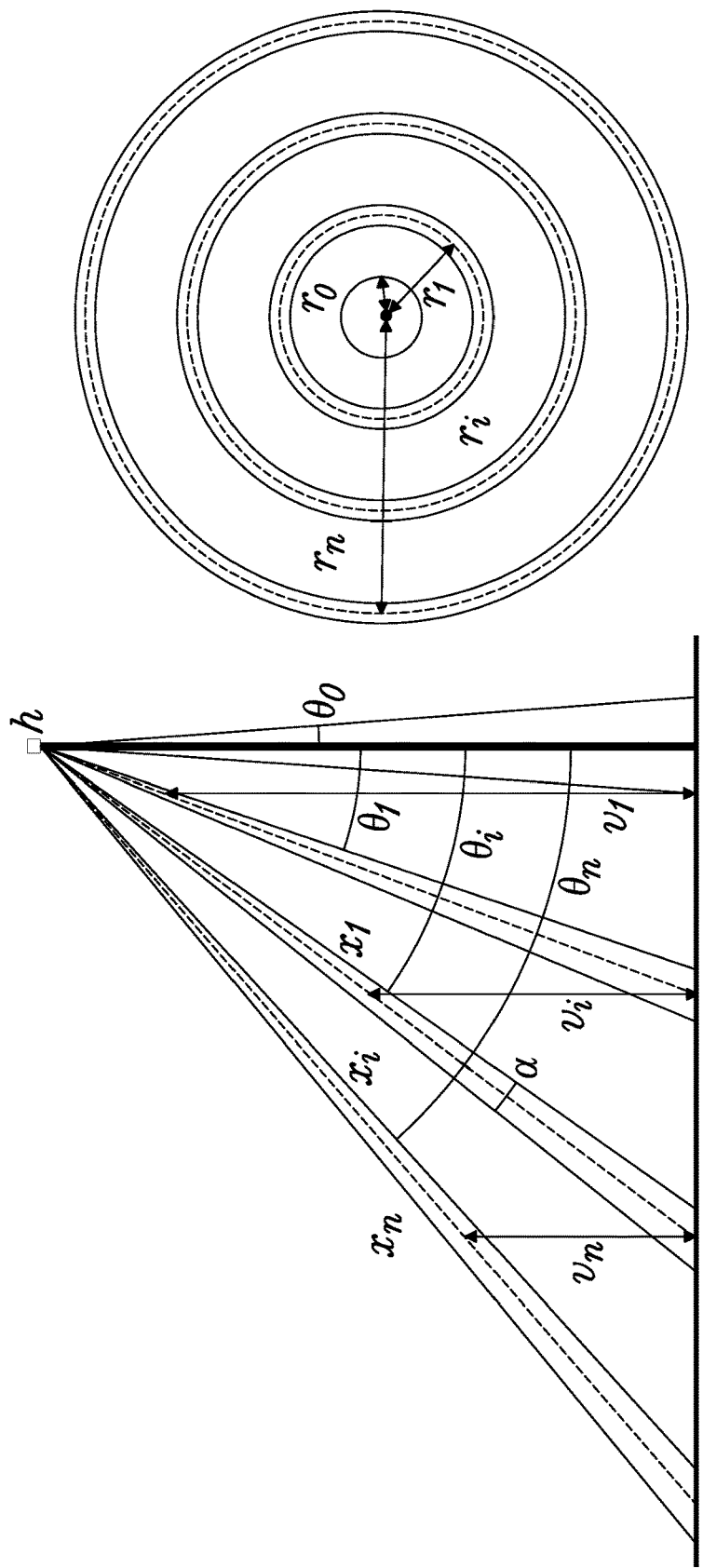
FIG. 5 includes FIG. 5A (side view) and FIG. 5B (bottom view) which show a concentric ring pattern.

The first example emission pattern is composed of several concentric light rings with a central circular zone as illustrated in FIG. 5.

Parameter h corresponds to the installation height of the sensor, angle $\theta_i$ is the half diffusion angle of each ring, $x_i$ is the distance between the light source and the ground along the diffusion path of the ring i (also referred as beam length), $v_i$ is the height clearance between the rings i and i−1, α is the angular width of the ring and the outer ring has a radius $r_n$. The diffusion angle of the center beam is denoted $\theta_0$. The receiver module has only one light sensitive cell and the field of view of the receiver is selected so it fits with the diffusion angle of the outer ring.

Using basic trigonometry, it is possible to establish that:

$$x_i = \frac{h}{\cos(\theta_i)} \quad (1)$$

$$r_i = h \tan(\theta_i) \quad (2)$$

$$v_i = \frac{(r_i - r_{i-1})}{\tan(\theta_i)} \quad (3)$$

Assuming that the beam length difference between two consecutive rings is given by $\Delta = x_i - x_{i-1}$, the dimension $x_i$ is defined by:

$$x_i = h + \Delta i \quad (4)$$

The dimension $x_n$ of the outer ring is given by:

$$x_n = \sqrt{r_n^2 + h^2} \quad (5)$$

The maximum number of rings that meets Eq. (4) is then given by:

$$n = \text{ceil}\left(\frac{x_n - h}{\Delta}\right) \quad (6)$$

For the first pattern example, the parameters of the installation are established so the received signal is composed of distinct pulses (each pulse corresponds to the signal returned by a ring). The width of the pulse emitted by the LEDDAR™ system in this example embodiment is about 40 ns (20 ns at half magnitude). During this time interval, the light travels 12 m. Consequently, the light returned from the ring i must travel 12 m more that the light of the ring i−1 to avoid merging their returned signals. In other words, Δ must be chosen greater or equal to 6 m.

Figure 7:
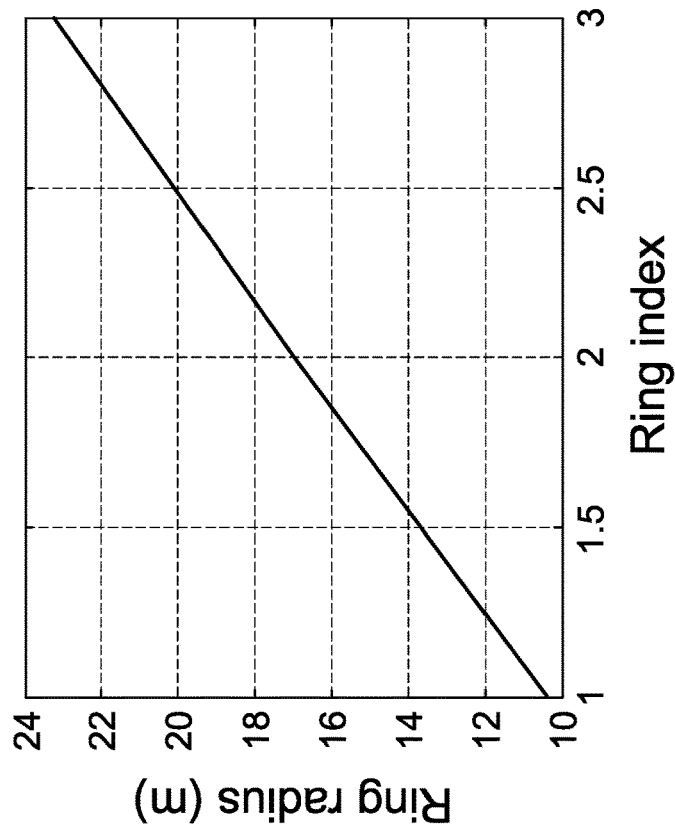
FIG. 7 is a graph of the ring radius of each ring.
Figure 6:
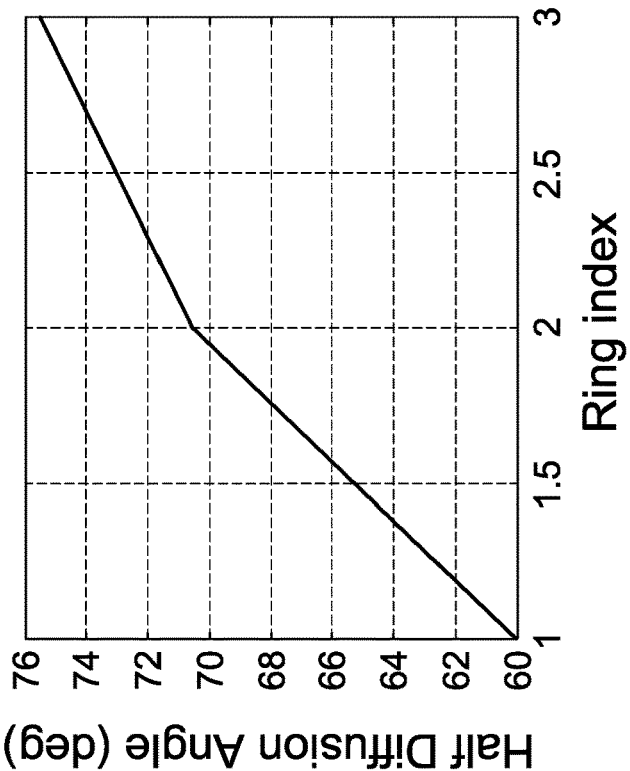
FIG. 6 is a graph of the half diffusion angle for each ring.
Figure 8:
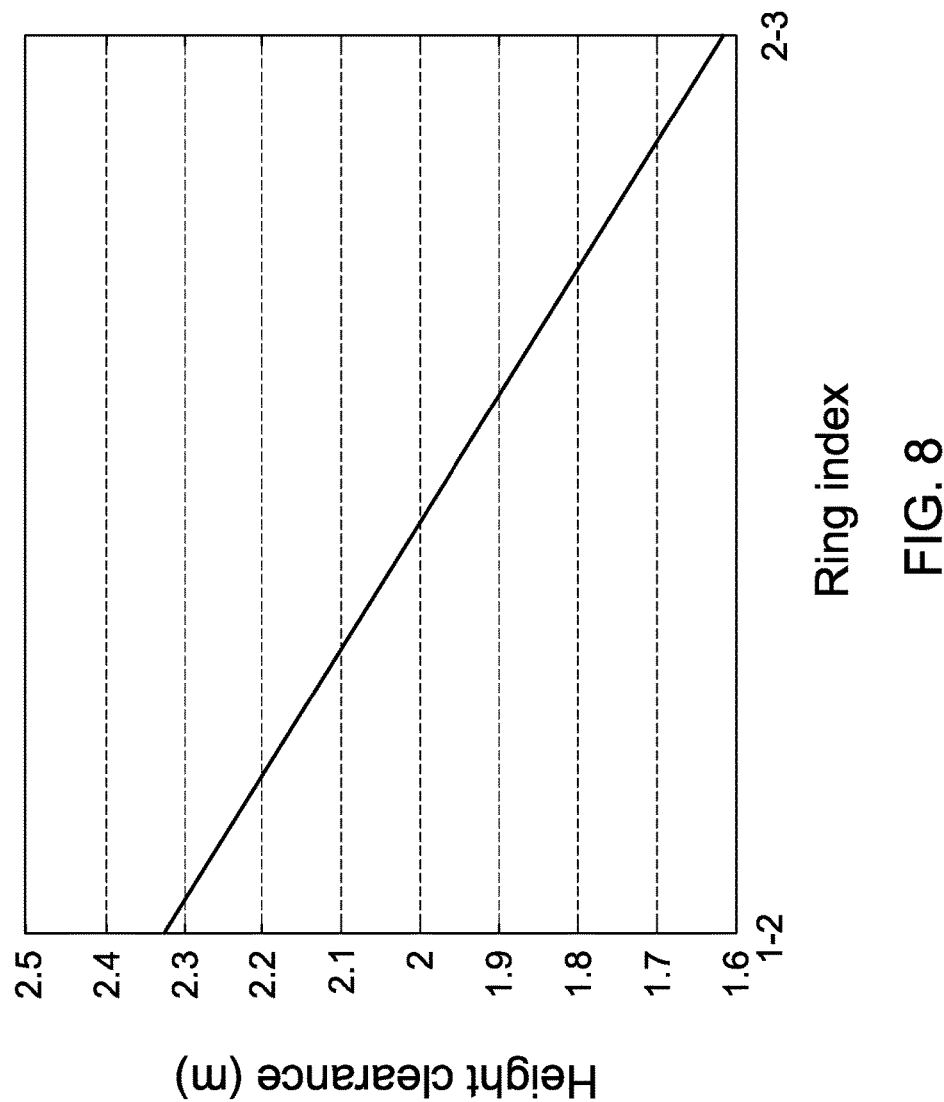
FIG. 8 is a graph of the height clearance between each consecutive ring pair.
Figure 9C:
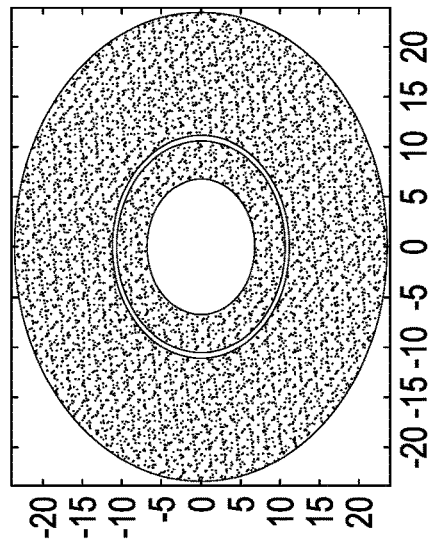
FIG. 9 includes FIG. 9A, FIG. 9B and FIG. 9C which show the coverage of the non-merging concentric ring pattern for an object having a height of 0.5 m, 1.5 m and 2 m respectively and FIG. 9D which is a table listing the covered area percentage for the non-merging concentric ring pattern (in a radius of 3 time the sensor mounting height)
Figure 9B:
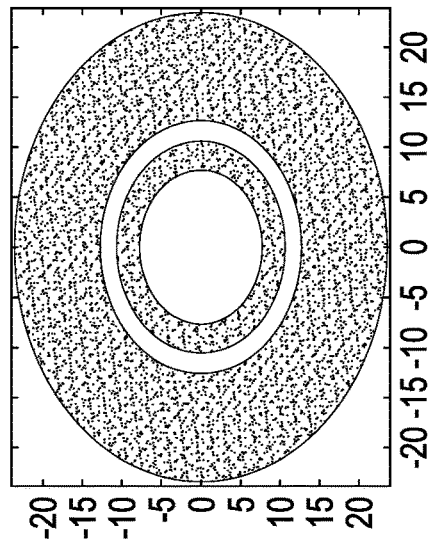
Figure 9A:
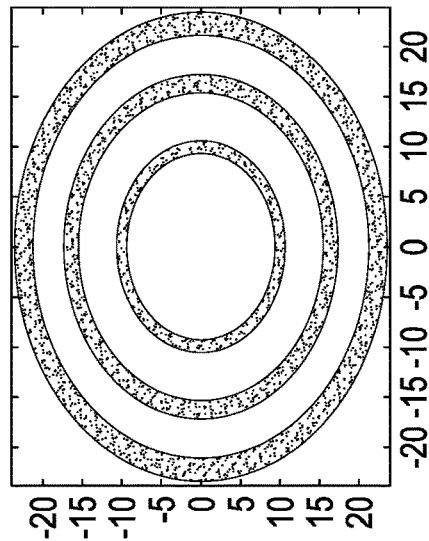

Assuming that the mounting height h is 6 m (20 feet), the beam length difference between consecutive rings Δ is 6 m and the desired outer ring radius $r_n$ is 3 times the mounting height, the half diffusion angle of each ring, computed from Eq. (1), is shown in FIG. 6. The ring radius given by Eq. (2) is shown in FIG. 7. The height clearance between rings computed from Eq. (3) is shown in FIG. 8. The coverage of this non-merging concentric ring pattern is shown in FIG. 9 for objects with a radius of 0.5 and a height of 0.5 m (FIG. 9A), 1.5 m (FIG. 9B) and 2 m (FIG. 9C). The ar-sand hatching-filled areas correspond to the zones where objects will be detected, namely the discrete active detection areas. The white-filled areas correspond to the blind zones, namely the passive areas in which detection does not occur. It is noted that the center beam of the emission pattern was omitted in these graphs. The coverage area percentage is summarized in FIG. 9D.

Example Pattern 2. Merging Signal Concentric Ring Pattern

The second example pattern is based on the concentric ring concept, but the beam length of each ring is not constrained to avoid the merging of the returned signal (Δ can be chosen smaller than 6 m). The pattern presented in this section is defined by considering a beam length difference of 3 m between consecutive rings instead of 6 m. The pattern coverage is shown in FIG. 10, again for objects with a radius of 0.5 and a height of 0.5 m (FIG. 10A), 1.5 m (FIG. 10B) and 2 m (FIG. 10C). The coverage area percentage in a radius of 3 times the mounting height is given in FIG. 10D. There is an improvement of the pattern coverage over the non-merging concentric ring pattern for a same example sensor installation.

Example Pattern 3. Uniform Dot Array Pattern

Figure 11:
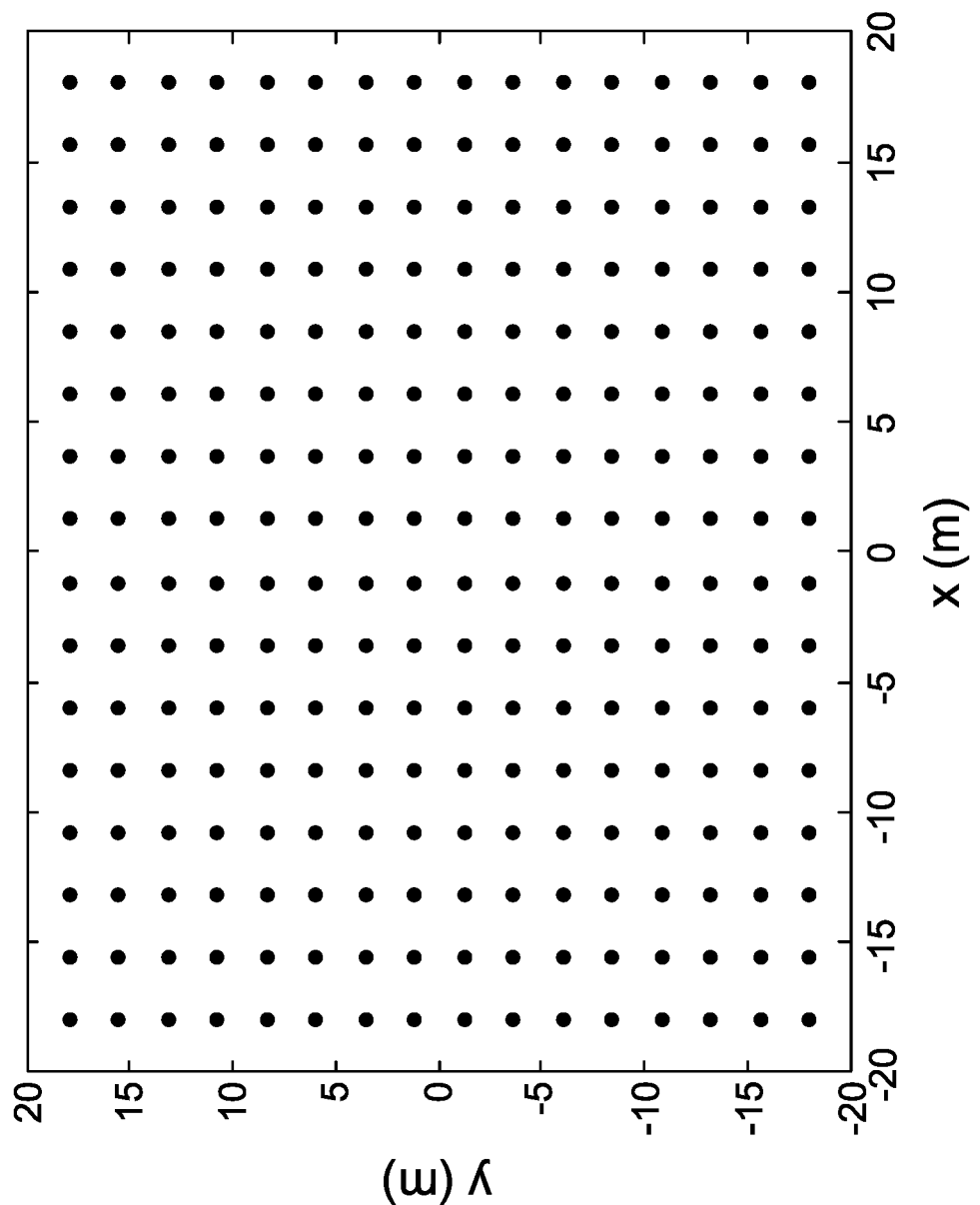
FIG. 11 shows a bottom view of a uniform 16×16 dot array pattern on a detection zone.

The third example emission pattern is an array of beams, distributed in such a way that their intersection with the ground forms a uniform grid. An example uniform 16×16 dot array pattern covering a square area of 36×36 m (resolution of 2.4 m) is shown in FIG. 11.

Figures 12A, 12B, 12C:
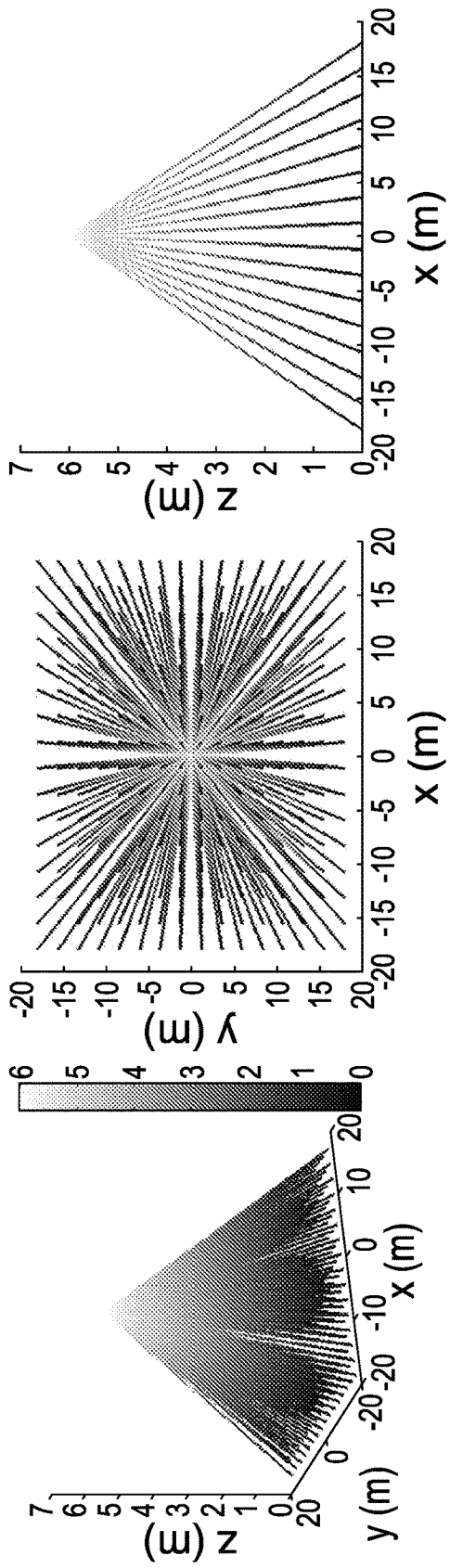
FIG. 12 includes FIG. 12A (incline view), FIG. 12B (bottom view) and FIG. 12C (side view) which show beams generated for a uniform 16×16 dot pattern.

Assuming that the sensor is installed at a height of 6 m, FIGS. 12A (incline view), 12B (bottom view) and 12C (side view) present the beams emitted to generate this 16×16 dot array pattern. It is noted that the grey level encodes the height of the given point along the beam with respect to the ground.

Figure 13C:
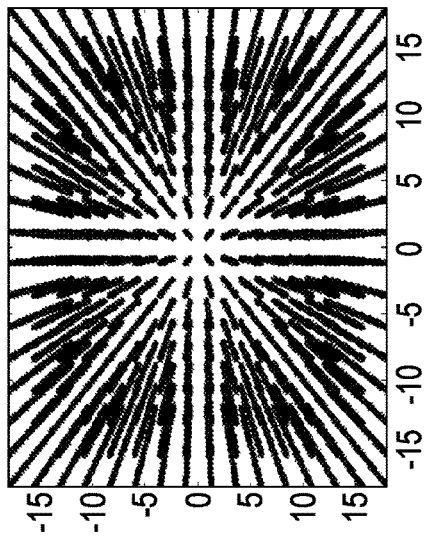
FIG. 13 includes FIG. 13A, FIG. 13B and FIG. 13C which show the coverage of the uniform 16×16 dot pattern coverage for an object having a height of 0.5 m, 1.5 m and 2 m respectively and FIG. 13D which is a table listing the covered area percentage for the uniform 16×16 dot array pattern (square area with side size of 3 times the sensor mounting height)
Figure 13B:
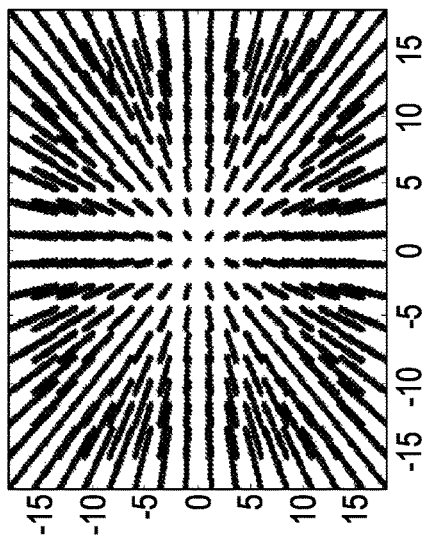
Figure 13A:
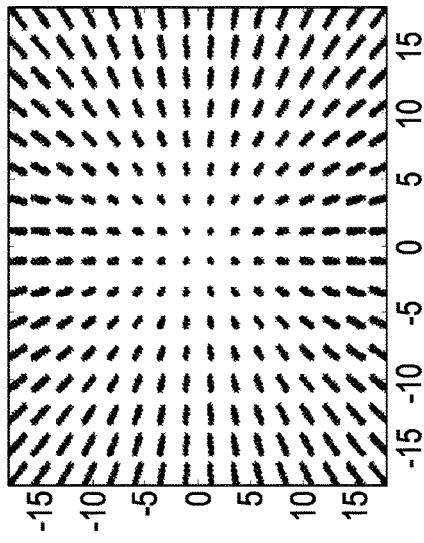

FIG. 13 shows the pattern coverage for an object with a height of 0.5 m (FIG. 13A), 1.5 m (FIG. 13B) and 2 m (FIG. 13C) and a radius of 0.5 m. ar-sand hatching-filled areas correspond to the zones where objects will be detected, namely the discrete detection areas. The white-filled areas correspond to the blind zones, namely the passive areas.

The quantitative information about the pattern coverage is provided in FIG. 13D. It is noted that the percentages are computed in a square area with side length of 3 times the sensor mounting height.

Example Pattern 4. Two Shifted Uniform Dot Array Pattern

Figure 14:
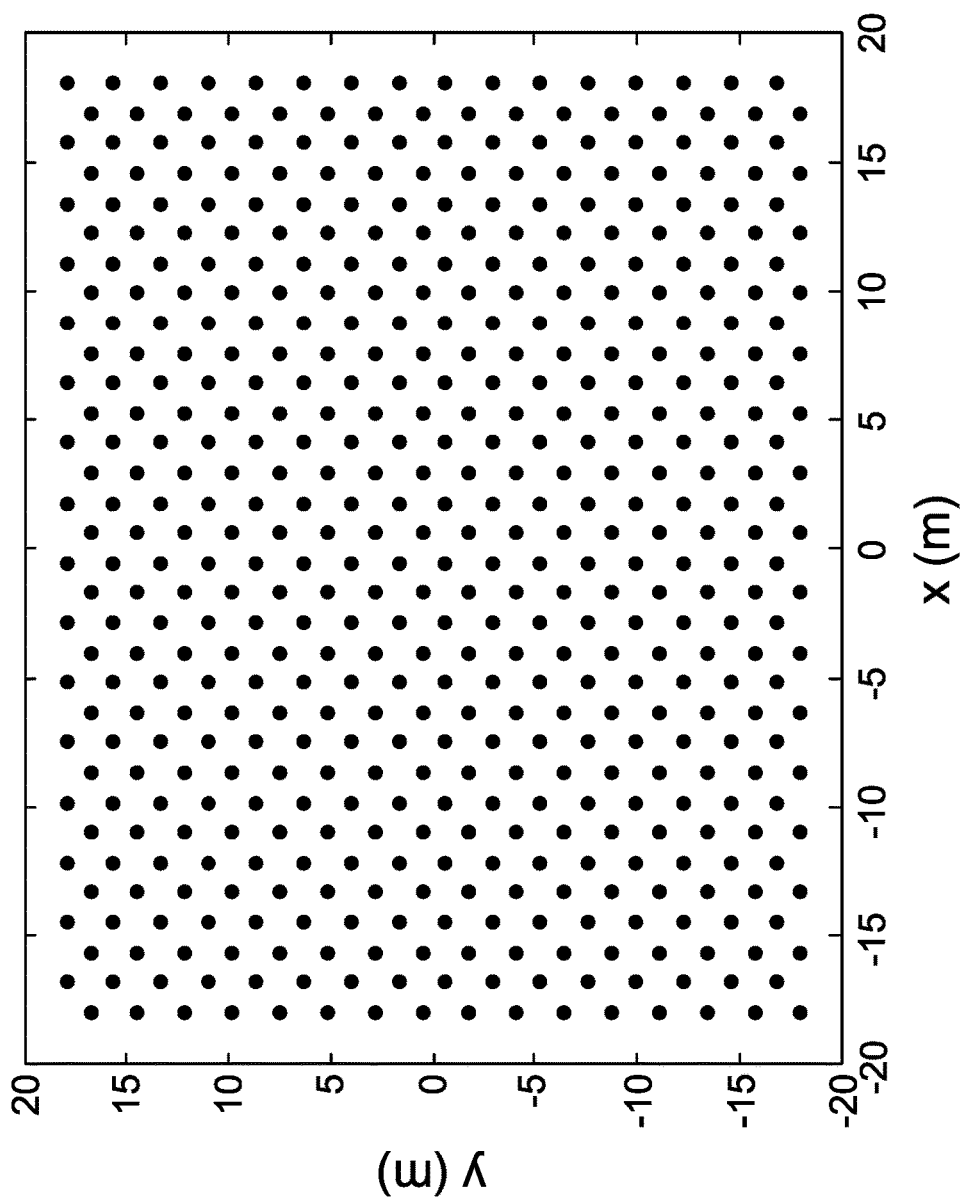
FIG. 14 shows a bottom view of a two shifted uniform 16×16 dot array pattern on a detection zone.

The fourth example pattern is built using two 16×16 uniform dot arrays shifted by half of the resolution in both directions. The resulting pattern is shown in FIG. 14.

Figures 15A, 15B, 15C:
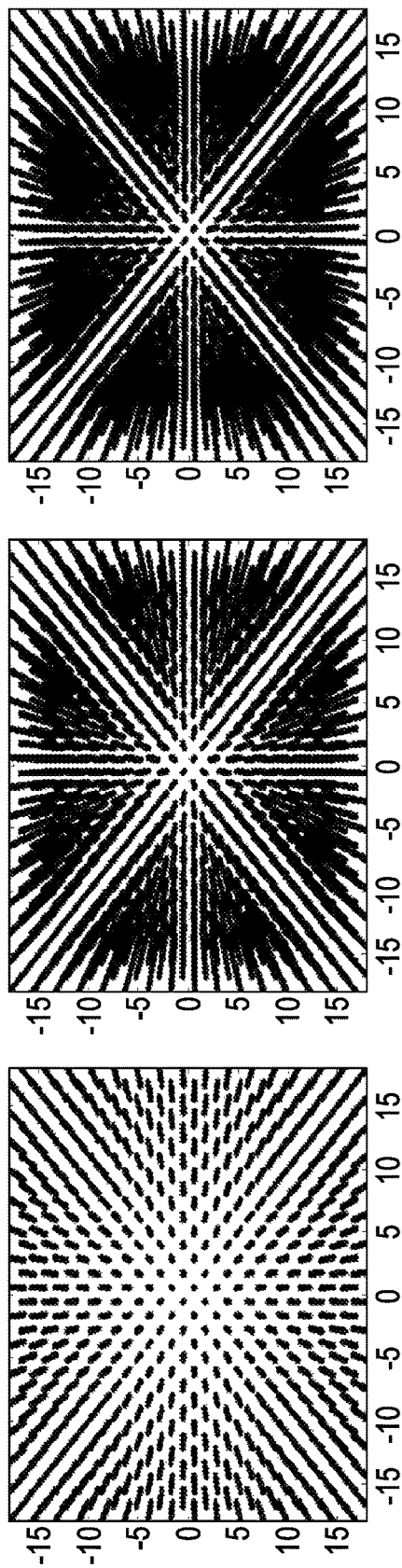
FIG. 15 includes FIG. 15A, FIG. 15B and FIG. 15C which show the coverage of the two shifted uniform 16×16 dot array pattern coverage for an object having a height of 0.5 m, 1.5 m and 2 m respectively and FIG. 15D which is a table listing the covered area percentage for the two shifted uniform 16×16 dot array pattern.

The area covered by this pattern for an object with a height of 0.5 m (FIG. 15A), 1.5 m (FIG. 15B) and 2 m (FIG. 15C) and a radius of 0.5 m is illustrated in FIG. 15.

The quantitative information about the coverage of this pattern is listed in FIG. 15D. The two shifted uniform dot array pattern has a lower coverage area than the uniform pattern for the same number of beams.

Example Pattern 5. Random Dot Pattern

Figure 16:
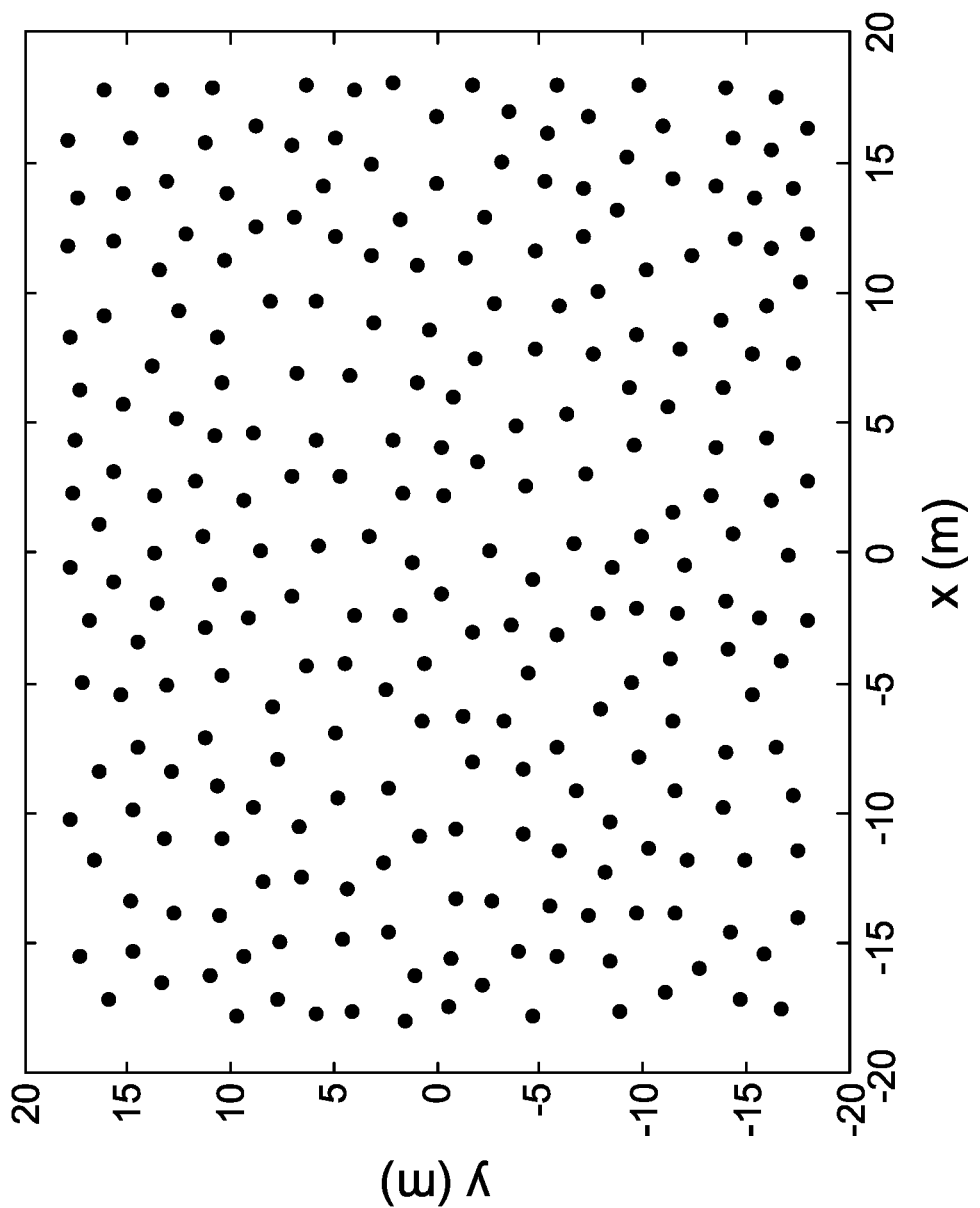
FIG. 16 shows a bottom view of a random 256 dot pattern on a detection zone.

The fifth example pattern is built from a randomly distributed dot array. The dots are selected using a uniform random generator. A minimum distance criterion is used to prevent dot clusters. An example random dot pattern with 256 dots (same number of dots as the uniform 16×16 dot array pattern of the previous example) is shown in FIG. 16. This example uses a uniform distribution of the dots, but it is also possible to generate a random dot pattern where the density of the dots changes. Applications that need the detection of small objects in specific sub sections of the monitored area could benefit from this density-varying strategy. In fact, instead of increasing the number of dots over the whole monitored zone and decrease dramatically the magnitude of the signal variation from background when an object enters in the monitored zone, the number of dots can be increased only for sub sections where useful. The distribution of the dots can also be adjusted to maximize the probability that an object crosses at least one beam when it is inside the monitored zone.

The coverage area of this pattern for an object radius of 0.5 m and heights of 0.5 m (FIG. 17A), 1.5 m (FIG. 17B) and 2.0 m (FIG. 17C) is shown in FIG. 17. The covered area percentage is summarized in FIG. 17D. This pattern has about the same coverage as that of the uniform 16×16 dot array pattern. However, there is no predetermined corridor where an object can move without intercepting a beam. The object detection reliability of the sensor equipped with this pattern is then expected to be greater.

As will be readily understood, the dimensions of the object to be detected will vary depending on the application. The above example patterns are configurable to the application needs. In the examples, detection results for an object having a radius of 0.5 m and a height between 0.5 m and 2 m are shown. These dimensions allow detection of most persons. In some of the examples, a resolution of 2.4 m is used. In order to increase the probability of detecting smaller moving objects, the resolution can be adjusted. A greater quantity of beams can be used (to create more illuminated dots) and/or the distance between the dots can be reduced.

Background Signal Variation

Ring Pattern

Figure 18:
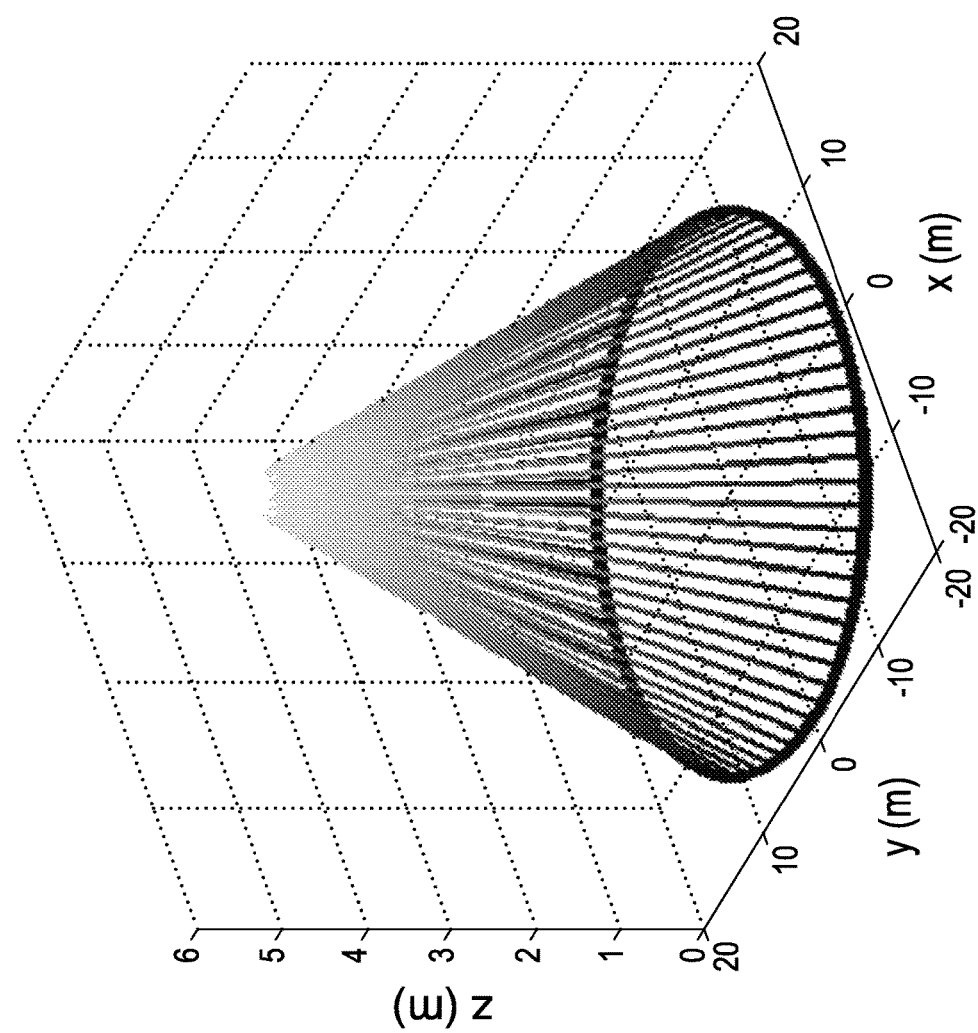
FIG. 18 is an incline view which shows the beams generated for a ring discretization.
Figure 19:
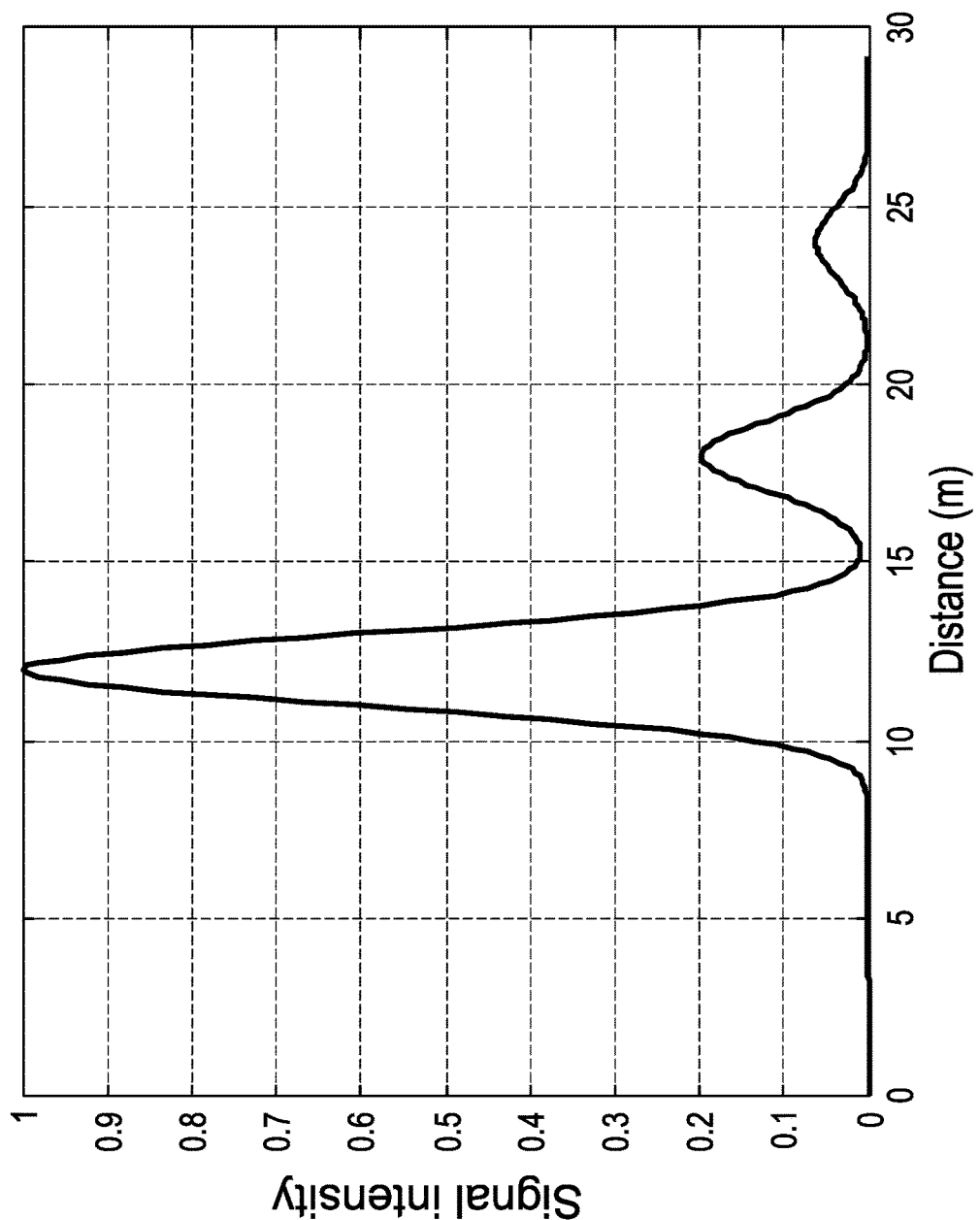
FIG. 19 is a graph showing the intensity of the background signal versus the distance for the non-merging signal concentric ring pattern.

This section presents a study of the variation of the received signal with respect to the background signal when an object crosses a given ring of the concentric ring pattern. The background signal is computed using the following scheme. The LED light source generating the pattern is pulsed periodically. For example, the LED light source is turned on during 40 ns every cycle. The ring is discretized in several hundreds of small light beams along its circumference (the thickness of the ring is assumed very small). The ring discretization is illustrated in FIG. 18. The signal received from each individual beam is modeled by a Gaussian function with a mean equivalent to the length of the beam and a standard deviation equal to 1 (the width of the pulse at 3 sigma is 6 m). The magnitude of the Gaussian function is weighted by a factor $r^{-4}$, where r is the length of beam. This weighting factor has been chosen by assuming that signal intensity is inversely proportional to the $4^{th}$ power of the distance (obtained from the study of real data). Other weighting factors could be used. The returned signals of the beams are summed up and the result is normalized to one. FIG. 19 shows the shape of the background signal corresponding to the non-merging concentric ring pattern described in Example pattern 1 hereinabove. As expected, the background signal has distinct peaks. Each peak corresponds to the signal returned by the ground lighted by a given ring. The peak magnitude decreases with the beam length of the ring.

The shape of the returned signal in the presence of an object is computed using a very similar approach as the one presented for background signal generation. The main differences are the following. The length of the discrete light beams obstructed by the object is shorter (object height divided by the sine of the angle between the beam and the ground). The object radius is assumed greater than the ring thickness. The ground and the object have the same reflectivity. The returned signal is not normalized to one, it is rather normalized using the same normalization factor as the one used to normalize the background signal.

Figure 20B:
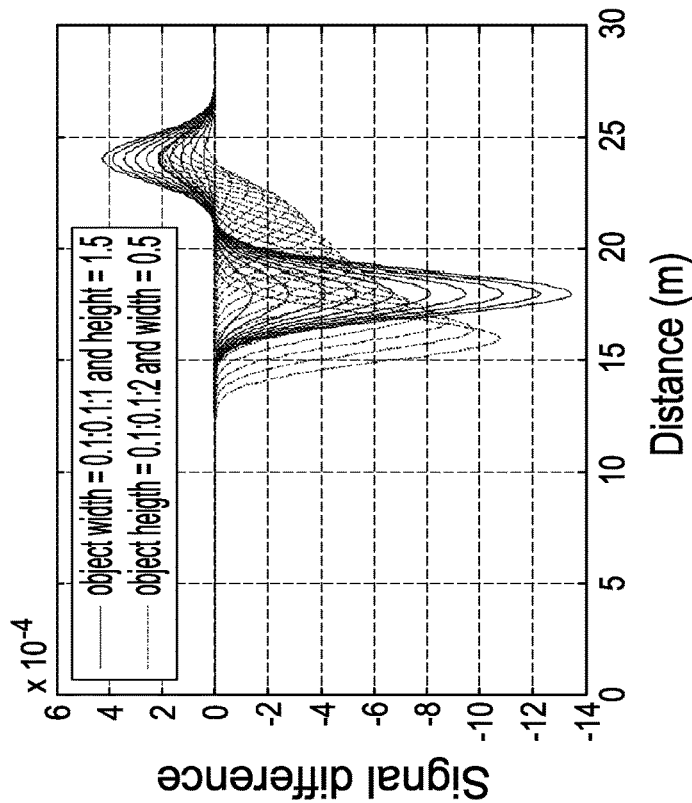
FIG. 20 includes FIG. 20A and FIG. 20B which are graphs of the signal variations from the background for the non-merging concentric ring pattern, in FIG. 20A, the object obstructs the ring with a half diffusion angle of 60.0 deg, in FIG. 20B, the object obstructs the ring with a half diffusion angle of 75.5 deg.
Figure 20A:
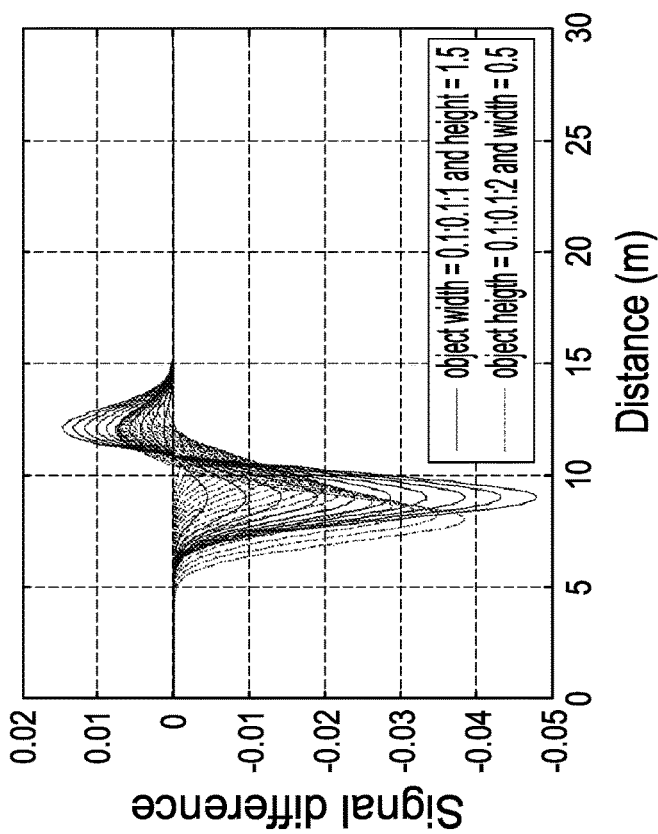

FIGS. 20A and 20B give the signal variations from the background for various object heights (from 0.2 to 2 m) and widths (0.1 to 1 m). FIGS. 20A and 20B are obtained when the object obstructs a part of the ring with a half diffusion angle of 60.0 deg and 75.5 deg respectively.

Figure 21B:
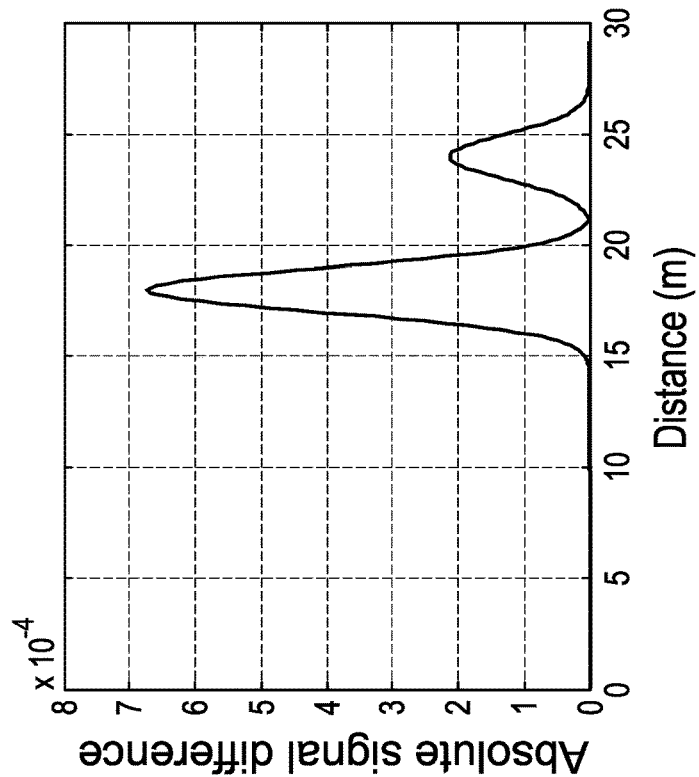
FIG. 21 includes FIG. 21A and FIG. 21B which are graphs of the absolute signal variations from the background for the non-merging concentric ring pattern, in FIG. 21A, the object obstructs the ring with a half diffusion angle of 60.0 deg, in FIG. 21B, the object obstructs the ring with a half diffusion angle of 75.5 deg.
Figure 21A:
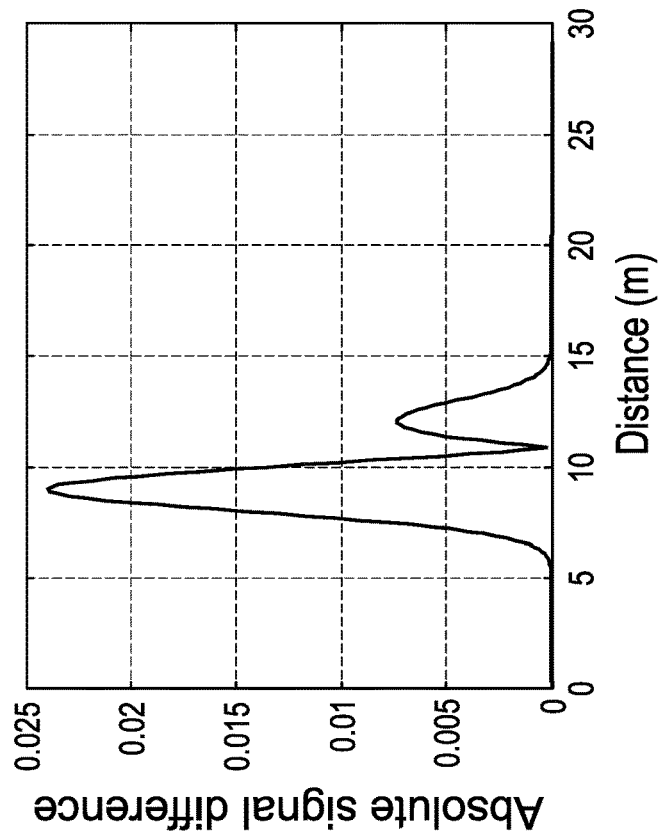

FIGS. 21A and 21B highlight the absolute signal variation when the object with a width of 0.5 and a height of 1.5 m obstructs the rings with the beam lengths of 12 and 24 m respectively.

Figure 22:
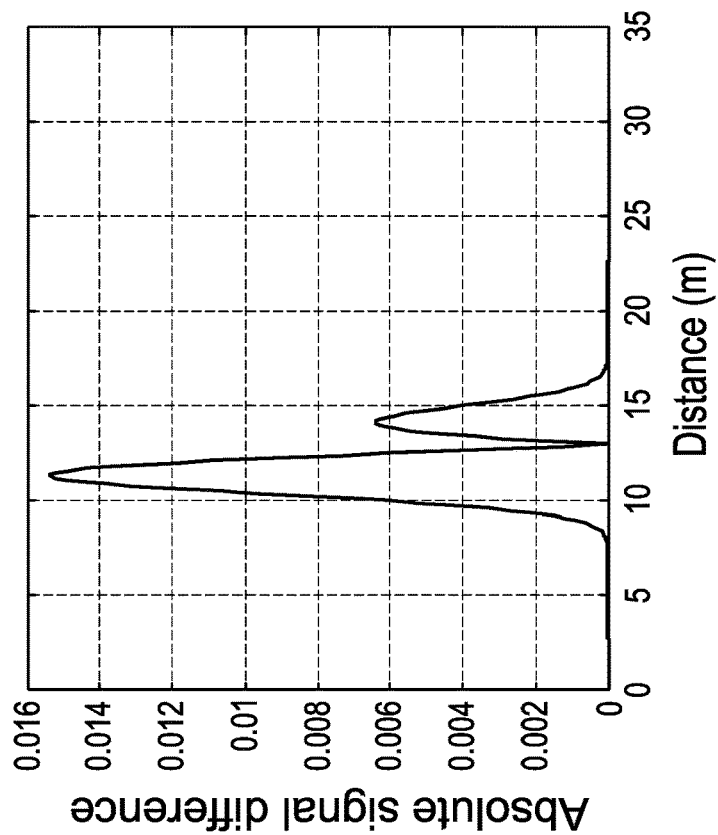
FIG. 22 is a graph showing the signal variation from background versus the installation height of the sensor.

The maximum signal variations are 0.0239 and 0.000668 when the obstructed rings have a half diffusion angle of 60.0 deg and 75.5 deg (or a beam length of 12 and 24 m). The signal variation from background decreases when the installation height of the sensor increases as is shown in FIG. 22. When the sensor is installed at 8 m (26 feet), the maximum signal variation is 0.0154 when the ring with a half diffusion angle of 60.0 deg is obstructed by an object.

Dot Array Pattern

The same signal variation from background analysis is conducted for the dot array pattern. The differences in the process are the following. Only one beam is obstructed by the object at a given time. The object radius is significantly greater than the size of the light beams (which means that the whole beam is obstructed by the object).

Figure 23:
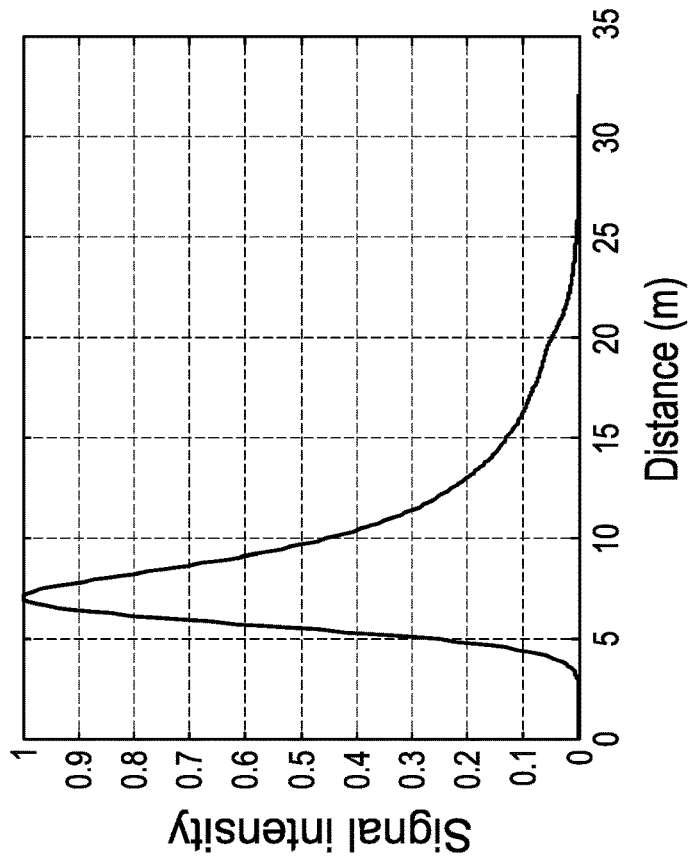
FIG. 23 is a graph showing the intensity of the background signal versus the distance for the 16×16 dot array pattern covering an area of 36×36 m.
Figure 24B:
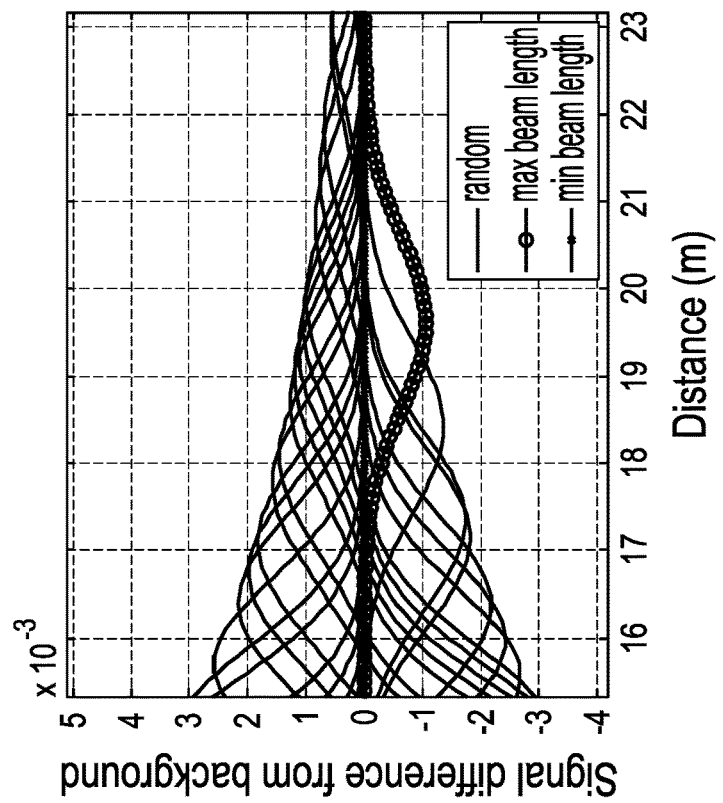
FIG. 24A presents an overview and FIG. 24B presents a detail on the smallest variation.
Figure 24A:
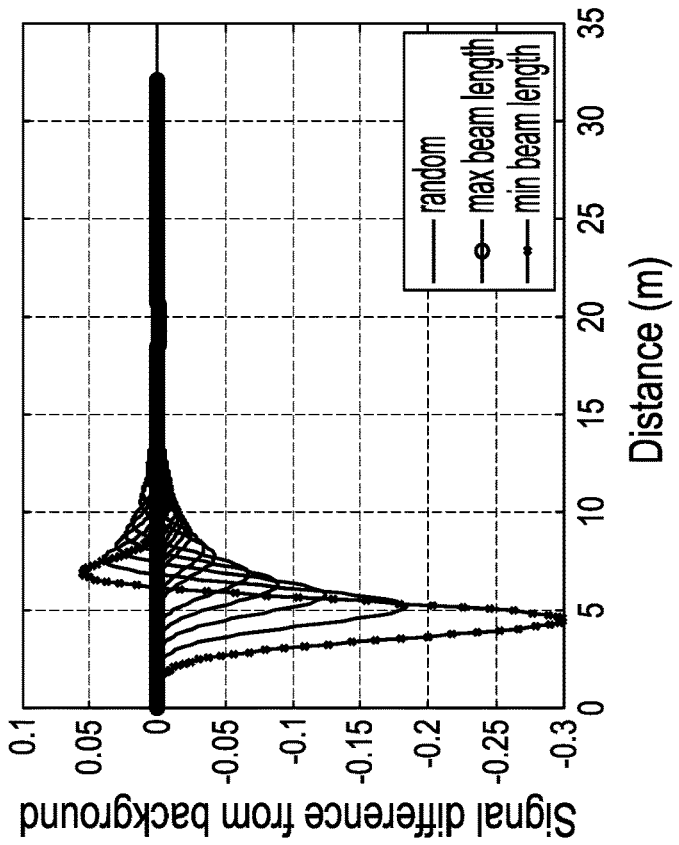

The background signal obtained from a uniform 16×16 dot array pattern covering an area of 36×36 m is shown in FIG. 23. The background signal has a skewed shape as a result of the summation of several reflections located at various distances. FIGS. 24A and 24B show the background signal variations for situations where the longest beam is obstructed by an object of 1.5-m height (min); the shortest beam is obstructed by the same object (max); random beams are obstructed by the same object (random). The maximum and the minimum variation magnitudes are respectively 0.300 and 0.00106. The signal variation will decrease by increasing the mounting height of the sensor as illustrated previously.

Figure 25B:
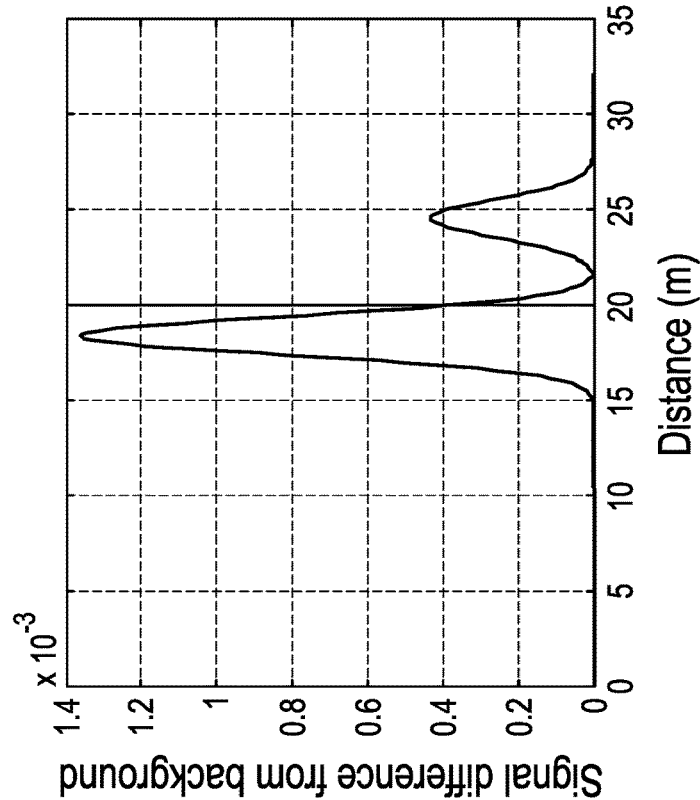
FIG. 25 includes FIG. 25A and FIG. 25B which are graphs of the absolute signal variations from the background for the 16×16 dot array pattern when an object with a radius of 0.5 m and a height of 1.5 m is located at 12 m in FIG. 25A and 24 m in FIG. 25B from the sensor.
Figure 25A:
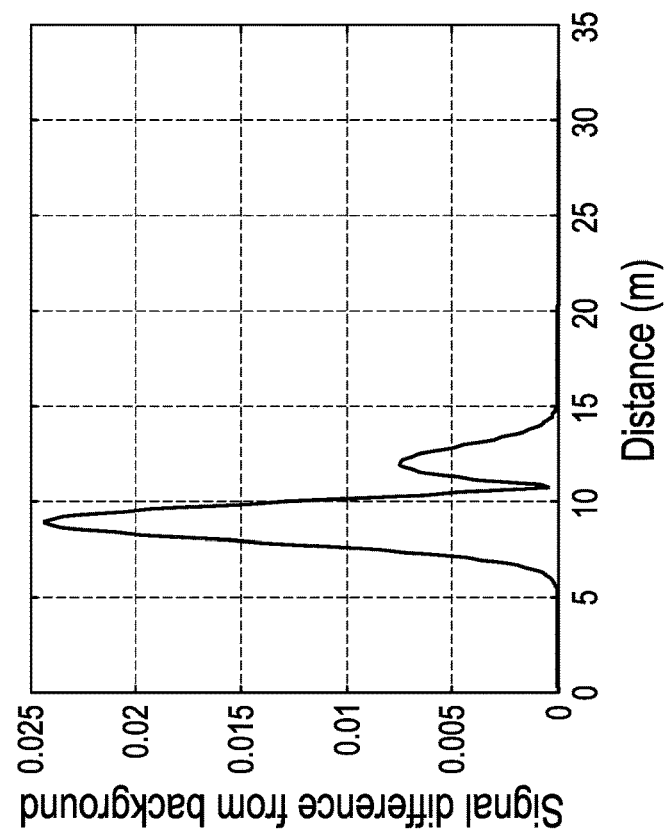

In order to compare the concentric ring versus the dot pattern on a common basis, FIGS. 25A and 25B show the signal variations from background when the beam with a length 12 and 24 m is obstructed by an object of 1.5-m height. The maximum variations are respectively 0.0243 and 0.00136. With short beam lengths, the signal variation magnitude of the dot pattern is similar that the one observed for the ring pattern. However, with higher beam lengths, the signal variation with dot array emission pattern becomes significantly higher. In other words, the dot array pattern offers a better detection reliability for the cases discussed herein.

Uniformly Lighted Surface

Figure 26B:
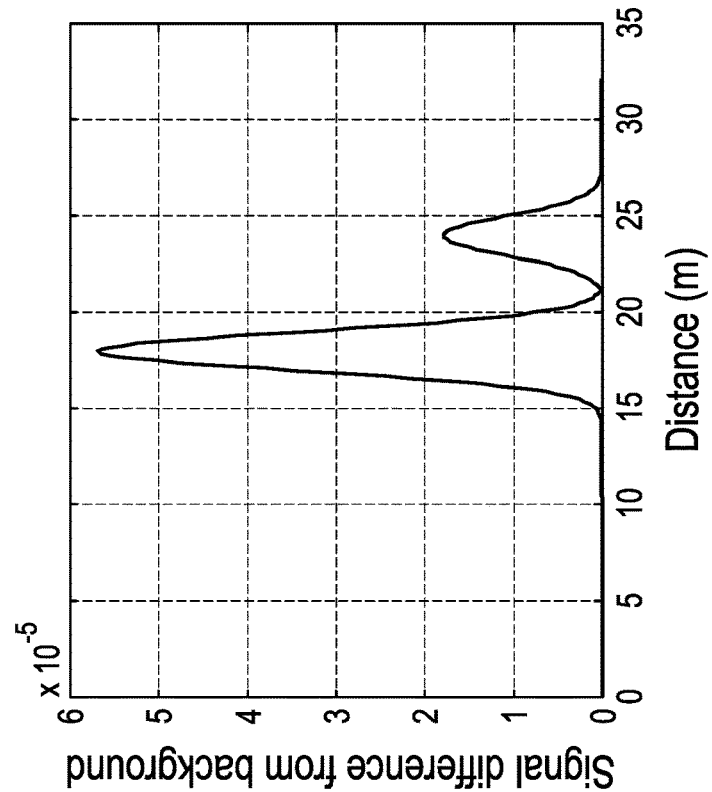
FIG. 26 includes FIG. 26A and FIG. 26B which are graphs of the absolute signal variations from the background for the uniformly lighted surface pattern when an object with radius of 0.5 m and a height of 1.5 m is located at 12 m in FIG. 26A and 24 m in FIG. 26B from the sensor.
Figure 26A:
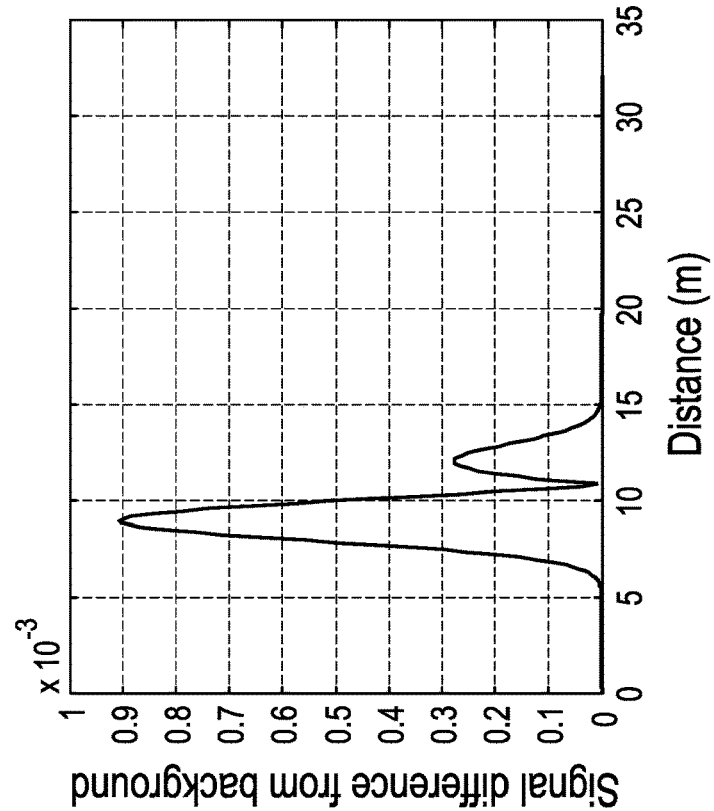

For comparison purposes, the background signal variation is also determined for an example embodiment in which the monitored square area is uniformly illuminated. In order to do so, the same approach as the one presented to analyse the signal variation of the ring pattern is used. In fact, the entire monitored zone was discretized into infinitely small surface elements infinitely close to each other. Each surface element is illuminated by a beam of light. The signal returned by each surface element is modeled as a Gaussian pulse. The pulse peak is located at a distance corresponding to the length of the beam. The signals coming from all surface elements were summed up and the result was normalized to one. When an object is present in the monitored zone, it intercepts a given number of the beams. The lengths of these beams is modified which creates a change in the background signal. Again, the object reflectivity is assumed to be the same as the one of the background. The size of the object is 1.5-m height by 0.5-m wide. FIGS. 26A and 26B show the signal variation from background when the average lengths of the intercepted beams are 12 and 24 m. This result shows that the signal variation is two orders of magnitude smaller than the variation observed by discretizing the monitored area with rings or dots.

Comparison of Example Patterns

Figure 27B:
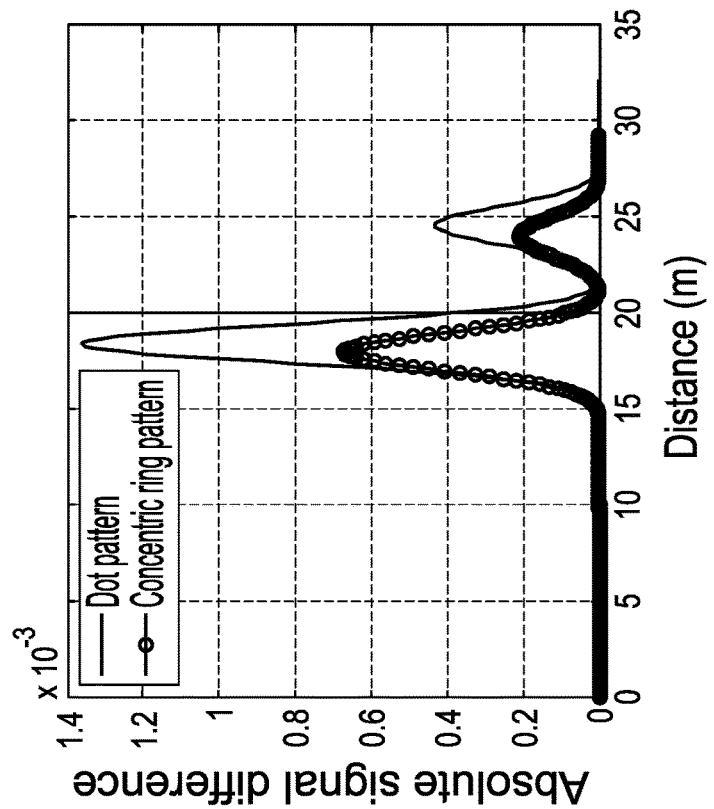
FIG. 27 includes FIG. 27A and FIG. 27B which are graphs comparing the absolute signal variations from background of the concentric ring and the 16×16 dot array pattern when an object with a radius and a height of 0.5 m and 1.5 m is located at 12 m in FIG. 27A and 24 m in FIG. 27B from the sensor.
Figure 27A:
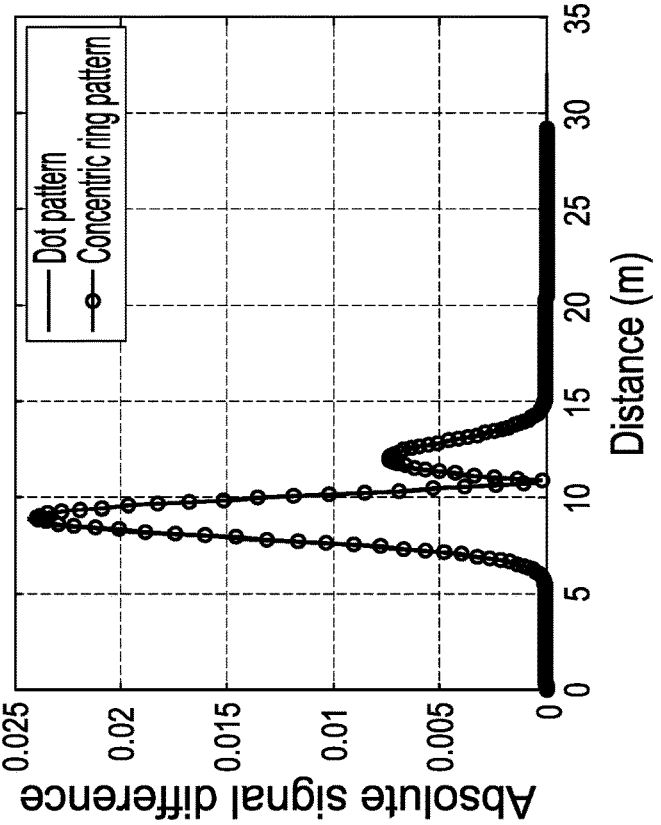

The advantages and disadvantages of the ring and dot array example patterns detailed herein are as follows. The concentric ring pattern has the following advantages. The detection is guaranteed at discrete distances of the sensor. The peaks correspond to each ring in the returned signal and it has good coverage area. Its main disadvantage is that small objects present between rings are not detected. The dot array pattern has the following advantages. The pattern is easily modifiable to cover any surface shape by obstructing/removing beams at the emission. It has good signal variation from the background. Its main disadvantage is that there is a risk of missed detection if the object is small or if the ground resolution of the pattern is too low. The comparison of the signal variation from their background as a function of the distance is given in FIGS. 27A and 27B. Quantitatively, both patterns are compared in FIG. 28.

The dot array pattern has several advantages over the ring pattern. However, the detection of the object with a radius of 0.5 and a height of 1.5 m cannot be guaranteed with a 16×16 dot array. To overcome this drawback, the number of dots can be increased. As will be readily understood, the choice of the appropriate pattern and pattern parameters for the application will be made by the detection system designer.

In order to maximize the signal variation from background, the generation of the pattern can be split between more than one diode working alternately. A plurality of photodiodes could be used, each with a partial pattern. By pulsating them alternately, an overall coverage would be obtained over time, even though only a partial pattern would be used at each single illumination instance. When each partial pattern covers a smaller surface, the signal variation with respect to the background when an object enters the detection zone is increased. The power emitted by the individual light source could also be increased with respect to the other in order to increase the detection capabilities of the sensor in a given sub section of the monitored zone. It could be also useful to increase the emission power of the partial patterns with higher beam length in order to increase the signal variation from background of far objects.

Simplified Method and System

Figure 29:
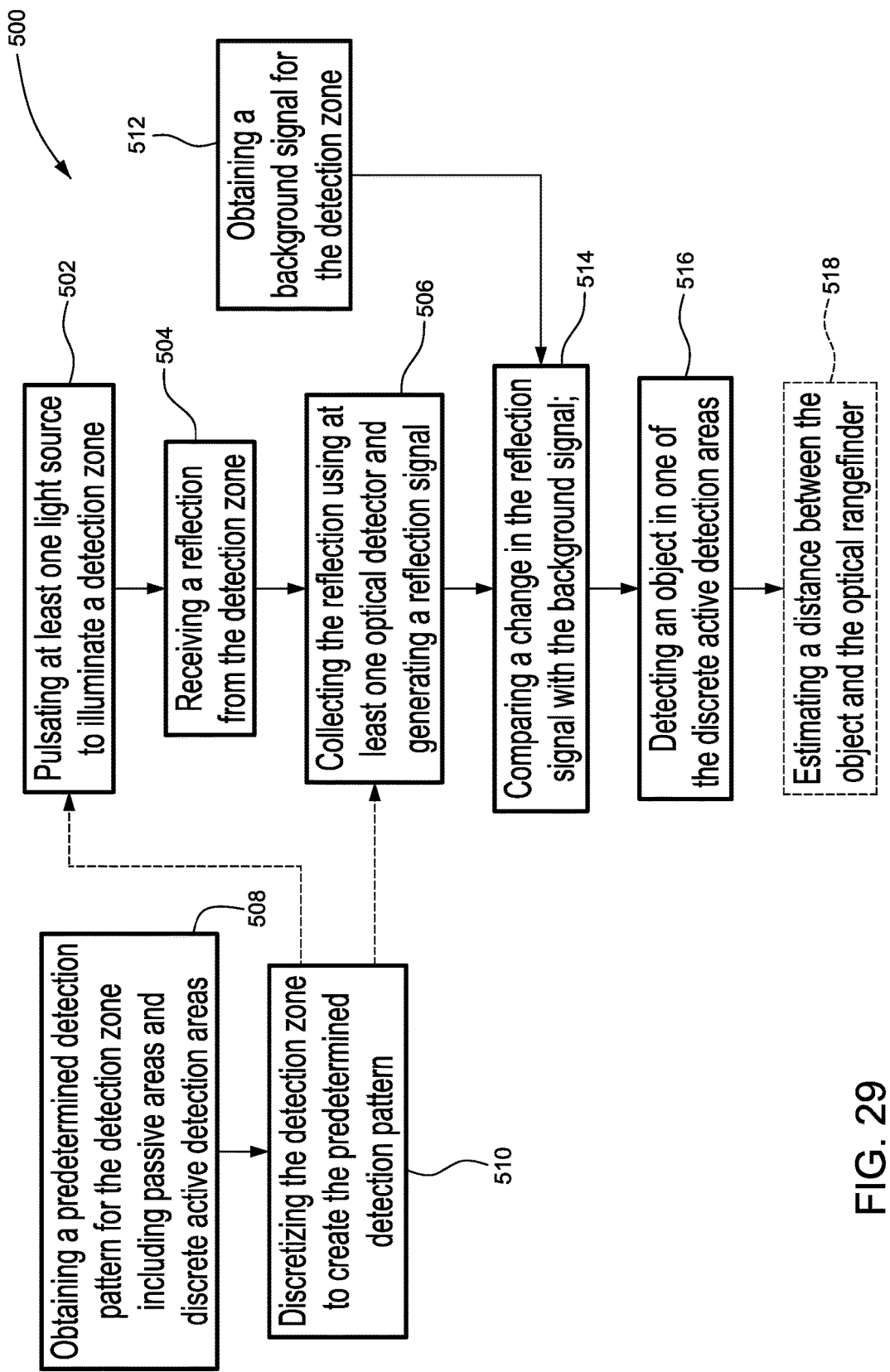
FIG. 29 is a flow chart of main steps of a simplified method for presence detection.

FIG. 29 is a flow chart of main steps of a simplified method 500 for presence detection. The steps are as follows: pulsating at least one light source to illuminate a detection zone 502, receiving a reflection from the detection zone 504, collecting the reflection using at least one optical detector and generating a reflection signal 506, obtaining a predetermined detection pattern for the detection zone including passive areas and discrete active detection areas 508, discretizing the detection zone to create the predetermined detection pattern 510, obtaining a background signal for the detection zone 512, comparing a change in the reflection signal with the background signal 514, detecting an object in one of the discrete active detection areas 516. Optionally, the distance between the object and the optical rangefinder can also be estimated 518. The step of discretizing the detection zone is carried out using emission optics and/or reception optics depending on the application. The steps of comparing the change in the reflection signal and detecting the object are performed by a processor.

Figure 30:
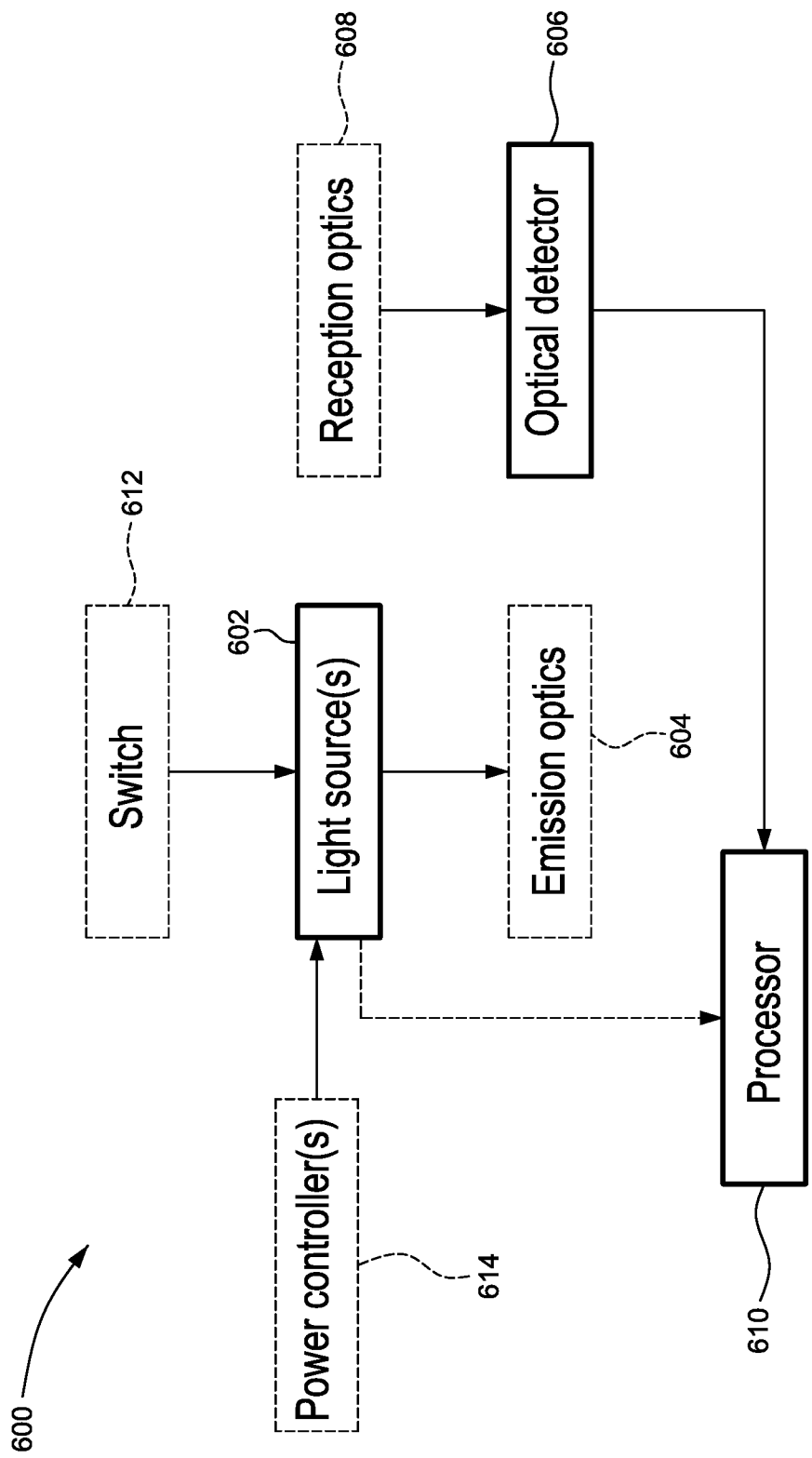
FIG. 30 is a block diagram of main components of a simplified presence detection system.

FIG. 30 is a block diagram of main components of a simplified presence detection system 600. The components of the system are as follows: light source(s) 602 adapted to be pulsed to illuminate the detection zone using an emission beam, optical detector 606 for receiving and collecting a reflection from the detection zone and for generating a reflection signal, at least one of emission optics 604 and reception optics 608 for discretizing the detection zone to create a predetermined detection pattern in the detection zone and processor 610 in electronic communication with at least the optical detector, the processor being programmed with computer-readable instructions, for detecting an object in one of the discrete active detection areas by comparing a change in the reflection signal with a background signal and for outputting a signal based on the detecting the object. Switch 612 for alternately illuminating the detection zone using at least two light sources, the predetermined detection pattern being created by a sum of partial detection patterns of the at least two light sources is optional. Power controller(s) 614 for controlling an intensity of the emission beam is also optional.

The embodiments described above are intended to be exemplary only. The scope of the invention is therefore intended to be limited solely by the appended claims.

The invention claimed is:

1. A method of detection of an object in a detection zone, for a scannerless optical rangefinder operating in pulsed Time-of-Flight operation, the method comprising:
   pulsating a light source to illuminate said detection zone using an emission beam;
   receiving a reflection from said detection zone, collecting said reflection using an optical detector and generating a reflection signal;
   discretizing said detection zone with at least one of emission optics and reception optics to create a predetermined detection pattern in said detection zone, said predetermined detection pattern being one of regular, uniform and random, said predetermined detection pattern including passive areas and discrete active detection areas within said detection zone;
   inputting said reflection signal and a background signal into a processor;
   detecting an object in one of said discrete active detection areas by comparing a change in said reflection signal with a background signal using a processor.

2. The method as claimed in claim 1, wherein said discretizing said detection zone includes shaping said emission beam into sub-beams using said emission optics, said discrete detection areas being discrete illuminated areas and said passive areas being non-illuminated areas.

3. The method as claimed in claim 2, wherein said illuminating said detection zone using said emission beam includes alternately illuminating said detection zone using at least two light sources, said shaping said emission beam including shaping each emission beam generated by said at least two light sources, said predetermined detection pattern being created by a sum of partial detection patterns of said at least two light sources.

4. The method as claimed in claim 3, further comprising individually controlling power emitted by each of said at least two light sources to generate said partial detection patterns thereby creating controlled detection sensitivity zones, a higher power partial detection pattern corresponding to a higher detection sensitivity zone.

5. The method as claimed in claim 1, wherein said discretizing said detection zone includes shaping said reflection signal using said reception optics to output a discretized reflection signal following said predetermined pattern.

6. The method as claimed in claim 1, wherein said predetermined pattern is one of concentric rings about a predetermined point, an array of regularly-arranged illuminated dots and a randomly generated pattern of illuminated dots.

7. The method as claimed in claim 1, wherein said light source is one of a Light-Emission-Diode (LED) light source and a laserdiode.

8. The method as claimed in claim 1, wherein said optical detector is a photodiode.

9. The method as claimed in claim 1, wherein said emission beam is one of a visible emission beam and an invisible emission beam, said visible emission beam being visible to an unaided human eye.

10. The method as claimed in claim 1, wherein said object is one of a vehicle, an automobile, a motorcycle, a truck, a bicycle, a cyclist, a pedestrian, an animal, a particle, a gas and a liquid.

11. The method as claimed in claim 1, further comprising estimating a distance between the object and the optical rangefinder by said change in said reflection signal with said background signal.

12. A presence detection system for a detection of an object in a detection zone, for a scannerless optical rangefinder operating in pulsed Time-Of-Flight operation, the system comprising:
    at least one light source adapted to be pulsed to illuminate said detection zone using an emission beam;
    an optical detector for receiving and collecting a reflection from said detection zone and for generating a reflection signal;
    at least one of emission optics and reception optics for discretizing said detection zone to create a predetermined detection pattern in said detection zone, said predetermined detection pattern being one of regular, uniform and random, said predetermined detection pattern including passive areas and discrete active detection areas within said detection zone;
    a processor in electronic communication with at least said optical detector, said processor being programmed with computer-readable instructions, for detecting an object in one of said discrete active detection areas by comparing a change in said reflection signal with a background signal and for outputting a signal based on said detecting said object.

13. A presence detection system as claimed in claim 12, further comprising a switch for alternately illuminating said detection zone using at least two light sources, said predetermined detection pattern being created by a sum of partial detection patterns of said at least two light sources.

14. A presence detection system as claimed in claim 13, further comprising at least one power controller for controlling an intensity of said emission beam.

15. A presence detection system as claimed in claim 12, wherein said light source is one of a Light-Emission-Diode (LED) light source and a laserdiode.

16. A presence detection system as claimed in claim 12, wherein said optical detector is a photodiode.

17. A presence detection system as claimed in claim 12, wherein said emission beam is one of a visible emission beam and an invisible emission beam, said visible emission beam being visible to an unaided human eye.

18. A presence detection system as claimed in claim 12, wherein said object is one of a vehicle, an automobile, a motorcycle, a truck, a bicycle, a cyclist, a pedestrian, an animal, a particle, a gas and a liquid.

19. A presence detection system as claimed in claim 12, wherein said processor is further for estimating a distance between the object and the optical rangefinder by said change in said reflection signal with said background signal.

\* \* \* \* \*

UNITED STATES PATENT AND TRADEMARK OFFICE
CERTIFICATE OF CORRECTION

| | | |
|---|---|---|
| PATENT NO. | : 10,488,492 B2 | Page 1 of 1 |
| APPLICATION NO. | : 15/509319 | |
| DATED | : November 26, 2019 | |
| INVENTOR(S) | : Pier-Olivier Hamel et al. | |

It is certified that error appears in the above-identified patent and that said Letters Patent is hereby corrected as shown below:

On the Title Page

Item (73), under "Assignee", in Column 1, Line 1, delete "Leddarttech Inc.," and insert
-- Leddartech Inc., --, therefor.

Signed and Sealed this
Twenty-fourth Day of March, 2020

Andrei Iancu
*Director of the United States Patent and Trademark Office*